(12) United States Patent
Oota et al.

(10) Patent No.: US 6,701,244 B2
(45) Date of Patent: Mar. 2, 2004

(54) EXCESS AIR FACTOR CONTROL DEVICE FOR INTERNAL COMBUSTION ENGINE

(75) Inventors: Kenji Oota, Yokosuka (JP); Hiroyuki Itoyama, Yokohama (JP); Hiroshi Iwano, Yokosuka (JP); Kensuke Osamura, Yokosuka (JP); Takeshi Ishino, Futtsu (JP)

(73) Assignee: Nissan Motor Co., Ltd., Yokohama (JP)

( * ) Notice: Subject to any disclaimer, the term of this patent is extended or adjusted under 35 U.S.C. 154(b) by 239 days.

(21) Appl. No.: 09/989,118

(22) Filed: Nov. 21, 2001

(65) Prior Publication Data

US 2002/0124832 A1 Sep. 12, 2002

(30) Foreign Application Priority Data

Dec. 26, 2000 (JP) ......................... 2000-396011
May 23, 2001 (JP) ......................... 2001-154385

(51) Int. Cl.[7] ..................... F02D 41/14; F02D 41/18
(52) U.S. Cl. ................. 701/104; 123/350; 123/681; 123/480; 477/111
(58) Field of Search .................. 701/104; 123/478, 123/480, 350, 679, 681; 477/111

(56) References Cited

U.S. PATENT DOCUMENTS 5,704,340 A * 1/1998 Togai .................. 123/676

FOREIGN PATENT DOCUMENTS

JP           11-294145          10/1999

* cited by examiner

Primary Examiner—Andrew M. Dolinar
(74) Attorney, Agent, or Firm—Foley & Lardner

(57) ABSTRACT

A basic target excess air factor tLAMBDA0 and a target fresh air intake amount tQac are set base upon the operation condition of an engine (30). A target excess air factor tLAMBDA is calculated by multiplying the ratio of a real fresh air intake amount rQac as detected by a sensor (16) and the target fresh air intake amount tQac by the basic target excess air factor tLAMBDA0. A fuel injector (9) is controlled so that the amount of fuel injected thereby converges to a target fuel injection amount tQf which corresponds to the target excess air factor tLAMBDA. It is possible to prevent variation of the output torque of the engine (30) accompanying a rich spike by this control, even if the basic target excess air factor tLAMBDA0 varies abruptly, since the fuel injection amount varies in correspondence to the variation of the real fresh air intake amount rQac.

19 Claims, 33 Drawing Sheets

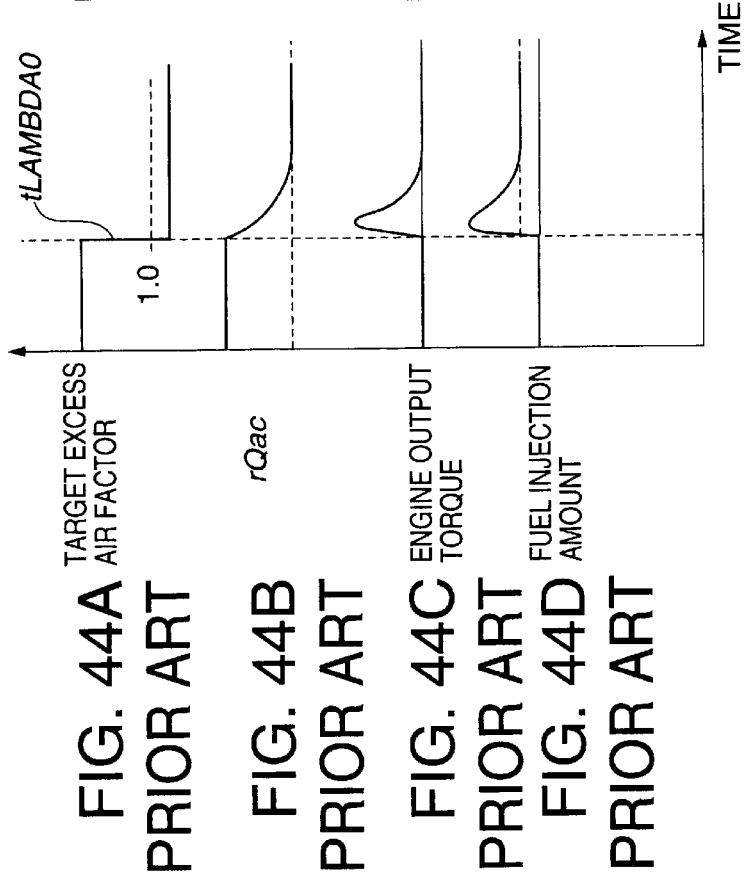

EXCESS AIR FACTOR CONTROL DEVICE FOR INTERNAL COMBUSTION ENGINE

FIELD OF THE INVENTION

This invention relates to control of the excess air factor of an internal combustion engine.

BACKGROUND OF THE INVENTION

Tokkai Hei 11-294145 published by the Japanese Patent Office in 1999 discloses a catalyst which accumulates nitrogen oxides (NOx) generated by a diesel engine of a vehicle when it is operated at a lean air/fuel ratio, in other words at a large access air factor. The catalyst is provided in the exhaust passage of the engine, and the NOx which is accumulated by the catalyst is eliminated from time ti time by operating the engine at a rich air/fuel ratio.

When the engine is operated at a rich air/fuel ratio, hydrocarbons (HC) are generated. The NOx accumulated in the catalyst is reduced by these hydrocarbons, and is released into the atmosphere as innocuous nitrogen (N2). By this elimination of NOx, the catalyst is regenerated back into its state in which it fresh air intake flow amount Qas0 can resume accumulation of NOx. Temporarily enriching the air/fuel ratio in this manner, in other words temporarily reducing the access air factor below unity, is termed a "rich spike". Such a rich spike is generated by reducing the intake air amount of the engine while increasing its fuel injection amount.

SUMMARY OF THE INVENTION

When a rich spike is generated, because of a reaction lag which depends upon the volume of the air intake system, although the fuel injection amount increases instantaneously, the intake air amount does not diminish immediately. As a result, a temporary sudden increase of the output torque of the engine may occur during a rich spike. Furthermore, for an engine in which the excess air factor is controlled based upon a target excess air factor, variation of the output torque of the engine can easily occur when altering the target excess air factor, due to a lag between the control response of the fuel injection amount and that of the intake air amount, not only in the case of a rich spike which is generated for regenerating the NOx catalyst, but in other cases as well. However, it is not desirable for the output torque of the engine to vary independently of the operation by the driver of the vehicle.

It is therefore an object of this invention to suppress variation of torque caused by alteration of the target excess air factor.

It is a further object of this invention to converge the excess air factor to the target excess air factor in a short time while suppressing the engine output torque when the target excess air factor has changed.

In order to achieve the above objects, this invention provides a device for controlling an excess air factor of an air-fuel mixture which is supplied to an engine. The device comprises a sensor which detects an operation condition of the engine, a fuel supply mechanism which supplies fuel to the engine, a sensor which detects a real fresh air intake amount of the engine; and a programmable controller. The programmable controller is programmed to set a basic target excess air factor based upon the operation condition, set a target fresh air intake amount based upon the operation condition, calculate a target excess air factor by correcting the basic target excess air factor based upon the target fresh air intake amount and the real fresh air intake amount, calculate a target fuel supply amount based upon the target excess air factor, and control a fuel supply amount of the fuel supply mechanism to be equal to the target fuel supply amount.

This invention also provides a method for controlling an excess air factor of an air-fuel mixture which is supplied to an engine by using a fuel supply mechanism which supplies fuel to the engine. The method comprising detecting an operation condition of the engine, detecting a real fresh air intake amount of the engine, setting a basic target excess air factor based upon the operation condition, setting a target fresh air intake amount based upon the operation condition, calculating a target excess air factor by correcting the basic target excess air factor based upon the target fresh air intake amount and the real fresh air intake amount, calculating a target fuel supply amount based upon the target excess air factor, and controlling a fuel supply amount of the fuel supply mechanism to be equal to the target fuel supply amount.

The details as well as other features and advantages of this invention are set forth in the remainder of the specification and are shown in the accompanying drawings.

BRIEF DESCRIPTION OF THE DRAWINGS

FIGS. 44A through 44D are timing charts showing the variation of the target excess air factor, fresh air intake amount, engine output torque, and fuel injection amount under a prior art excess air ratio control.

FIGS. 45A through 45D are a timing chart showing the variation of the target excess air factor, fresh air intake amount, engine output torque, and fuel injection amount under the excess air ratio control according to this invention.

DESCRIPTION OF THE PREFERRED EMBODIMENTS

Figure 1:
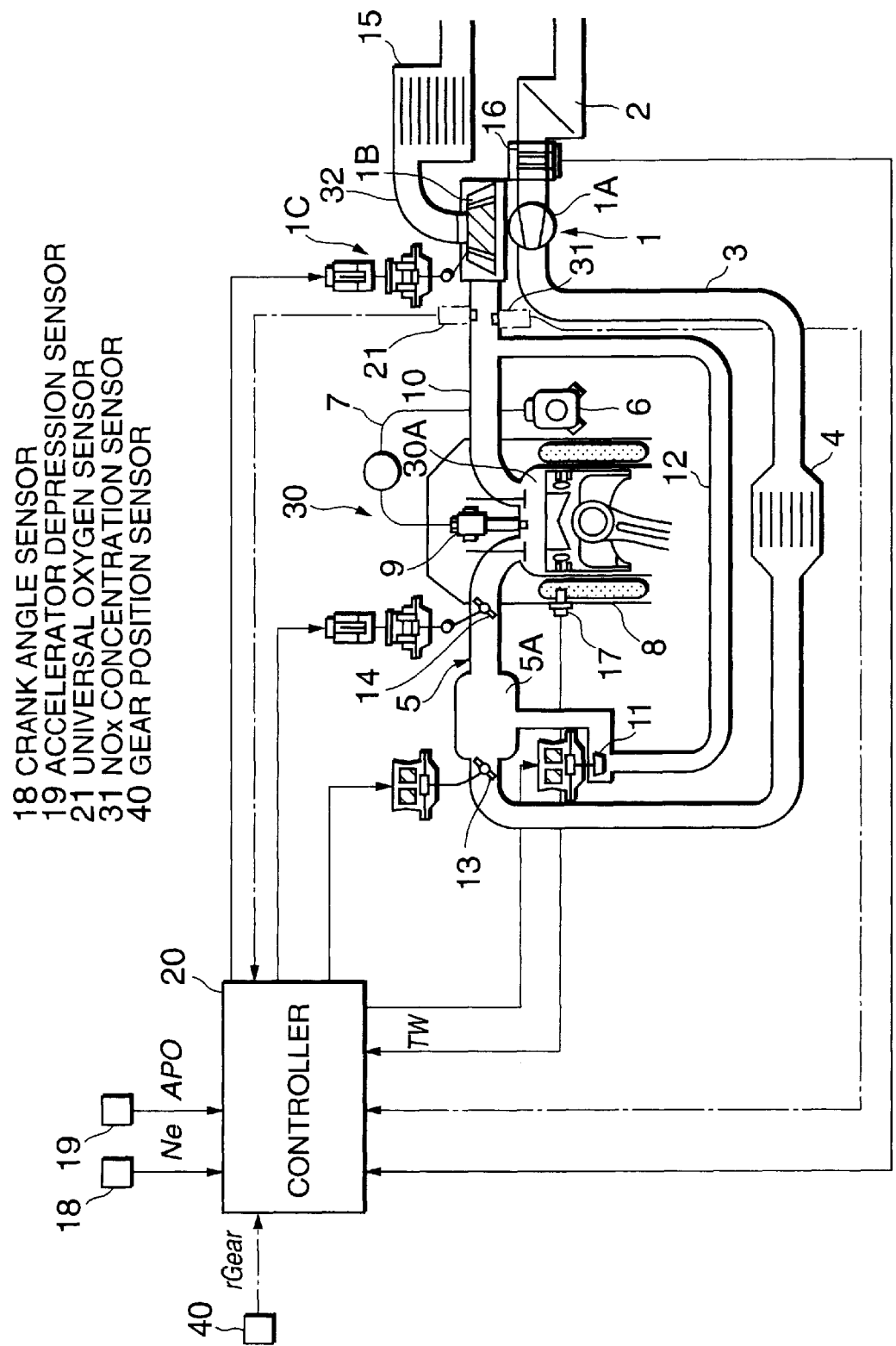
FIG. 1 is a schematic diagram of an excess air factor control device according to this invention.

Referring to FIG. 1 of the drawings, a multi cylinder direct injection type diesel engine 30 for a vehicle comprises an intake passage 3 and an exhaust passage 32.

In the intake passage 3 there are provided an air cleaner 2 which eliminates dust from the intake air, a compressor 1A of a turbocharger 1 which supercharges the intake air, an intercooler 4 which cools the compressed intake air, and an electronic throttle 13. The intake passage 3 is connected to the cylinders of the diesel engine 30 via a collector 5A and an air intake manifold 5. A swirl control valve 14 for making the intake air swirl in each cylinder is provided in the air intake manifold 5.

An exhaust gas recirculation (EGR) passage 12 which recirculates a portion of the exhaust in the exhaust passage 32 is connected to the collector 5A. An exhaust gas recirculation valve (EGR valve) 11 is provided in the EGR passage 12 for controlling the flow amount of recirculated exhaust gas (EGR amount).

A fuel injector 9 which injects fuel in correspondence to the intake air is provided to each of the cylinders 30A of the diesel engine 30. These fuel injectors 9 are connected to a common fuel supply pump 6 via a common rail 7.

The exhaust gas from the diesel engine 30 is exhausted through an exhaust manifold 10 to the exhaust passage 32. An exhaust turbine 1B of the turbocharger 1 and a NOx trap catalyst 15 are provided in the exhaust passage 32. This exhaust turbine 1B includes a so called variable geometry system which is actuated via an actuator 1C. The EGR passage 12 is connected to the exhaust passage 32 upstream of the exhaust turbine 1B.

The electronic throttle 13, the EGR valve 11, the actuator 1C and the swirl control valve 14 are controlled by signals which are supplied from a programmable controller 20. The electronic throttle 13 is a throttle used only during idling operation or under low load conditions, and during normal engine operation it is fully opened. This electronic throttle 13 is independently controlled from the actuation of the accelerator pedal (not shown in the figures).

The controller 20 comprises one or a plurality of microcomputers each of which comprises a central processing unit (CPU), a read only memory (ROM), a random access memory (RAM), and an input/output interface (I/O interface).

For the above described control process, to the controller 20 there are supplied the output signals from an air flow meter 16 which detects the intake amount of fresh air, a water temperature sensor 17 which detects the temperature Tw of the cooling water of the diesel engine 30, a crank angle sensor 18 which outputs a Ref signal which represents a certain crank angle of the engine 30, and an accelerator pedal depression sensor 19 which detects a depression amount of an accelerator pedal (also not shown) provided to the vehicle. Since the interval of Ref signal is proportional to the rotation speed Ne of the engine 30, it is possible to detect the engine rotation speed Ne from the Ref signal.

When the NOx trapping capability of the NOx trap catalyst 15 is saturated, the controller 20 performs control so as to create a rich spike, in order to regenerate the NOx trap catalyst 15. The target excess air factor is reduced stepwise by such a rich spike, but the fresh air intake amount reacts with respect to variation of the target excess air factor with a certain lag. Thus, the controller 20 corrects the target excess air factor according to the response lag of the fresh air intake amount.

Since the fuel injection amount of the fuel injector 9 is determined based on the excess air factor, variation of the output torque of the diesel engine 30 is prevented by reducing the target excess air factor. The controller 20 also controls the EGR valve 11 and the throttle 13.

The controller 20 executes the routines shown in FIGS. 2, 10, 14, 17, 20, 21, 24, 25, 27, 29, 30, 31, and 32 for controlling the fresh air intake amount and the fuel injection amount. Each of these routines is executed repeatedly at intervals of ten milliseconds while the diesel engine 30 Is running. These routines are applied not only in this embodiment, but will be applied in other embodiments described later unless otherwise noted. All of the maps which are mentioned in the following explanation are stored in the ROM of the controller 20 in advance.

First, the control of the fresh air intake amount will be explained. This fresh air intake amount varies according to the supercharging pressure provided by the turbocharger 1, and this supercharging pressure provided by the turbocharger 1 is increased or decreased by actuation of the actuator 1C. The controller 20 controls the supercharging pressure by outputting a signal to the actuator 1C.

Figure 3:
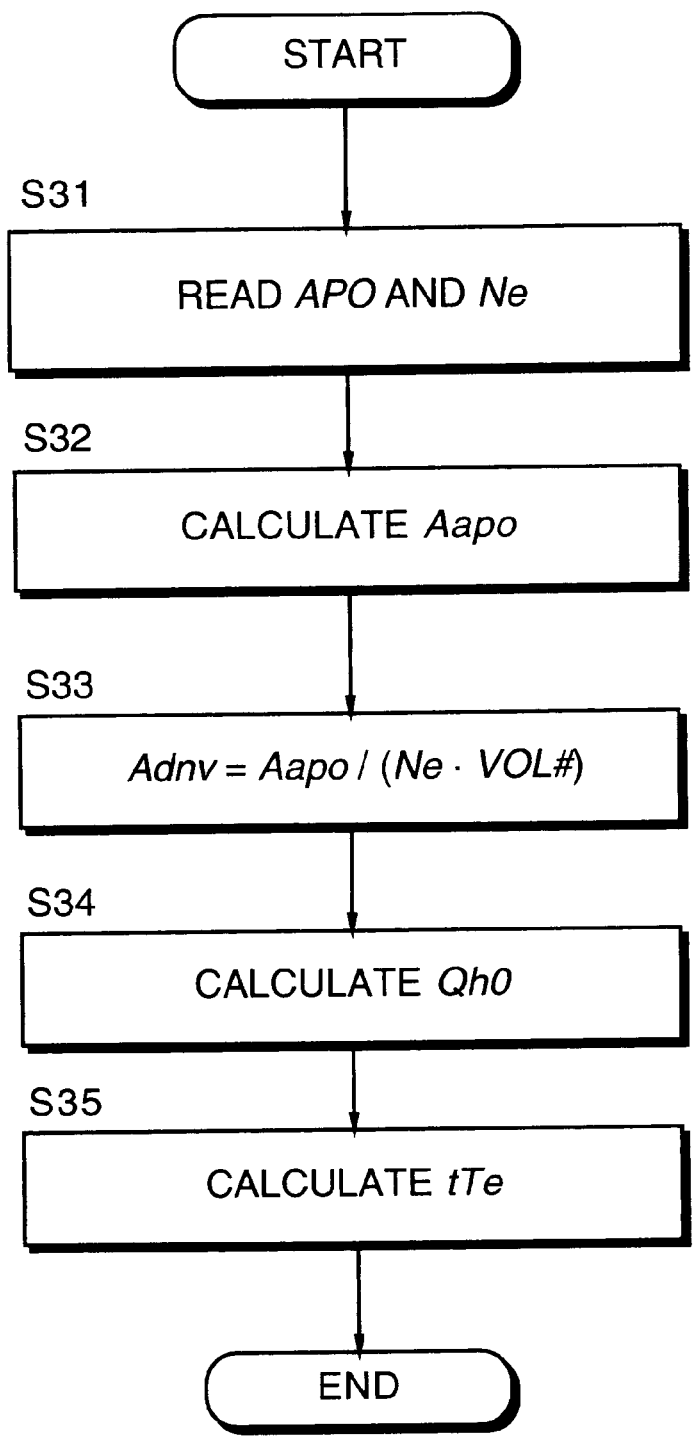
FIG. 3 is a flow chart for explanation of a calculation routine for a target engine output torque tTe executed by the controller.

For this control, the controller 20 calculates a target value tTe for the engine torque using a routine whose flow chart is shown in FIG. 3.

Referring to this figure, first the controller 20, in a step S31, reads in the depression amount APO of the accelerator pedal and the engine rotation speed Ne.

Figure 4:
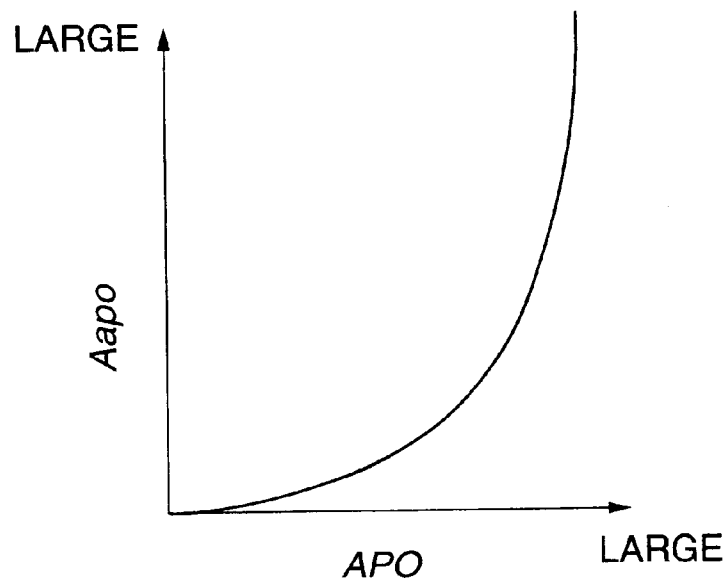
FIG. 4 is a diagram showing a characteristic of a map of intake passage virtual opening area Aapo, stored in the controller.

Next, in a step S32, a map whose characteristic is shown in FIG. 4 is referred to, and the depression amount APO of the accelerator pedal is converted into an intake passage virtual opening area Aapo. Although the diesel engine 30 incorporates no throttle for adjusting the air intake amount such as is present in a gasoline engine, the intake passage virtual opening area Aapo is used as a value which corresponds to throttle opening area for a gasoline engine. It should be noted that the electronic throttle 13 is used only during idling operation or under low load conditions, and in other conditions it is fully opened.

Next, in a step S33, the intake passage virtual opening area Aapo is converted into a converted value Adnv for one cubic centimeter of exhaust gas of the diesel engine 30 by the following Equation (1):

$$Adnv = Aapo/(Ne\ VOL\#) \tag{1}$$

where, $VOL\#$ = exhaust amount from the cylinders 30A.

Figure 5:
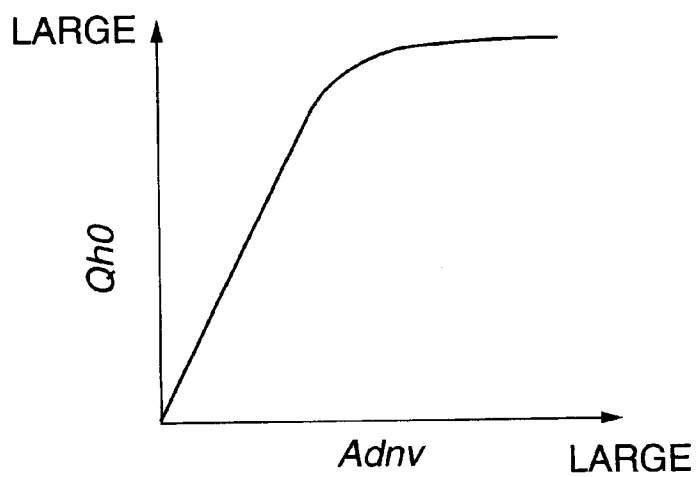
FIG. 5 is a diagram showing a characteristic of a map of a load proportion corresponding value Qh0, stored in the controller.

Next, in a step S34, a map whose characteristic is shown in FIG. 5 is referred to, and a load proportion corresponding value Qh0 which corresponds to the load upon the diesel engine 30 is calculated from this converted value Adnv.

The calculation process for the load proportion corresponding value Qh0 described in the above steps S31 through S34 is per se known from U.S. Pat. No. 6,055,476.

Figure 6:
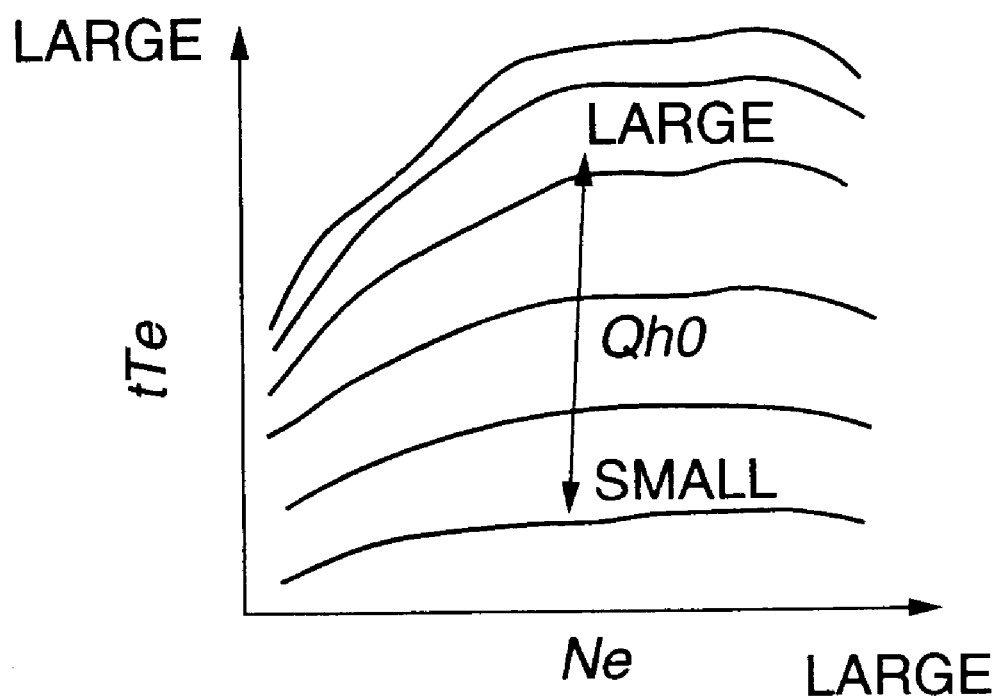
FIG. 6 is a diagram showing a characteristic of a map of a target engine output torque tTe, stored in the controller.

Next, in a step S35, a map whose characteristic is shown in FIG. 6 is referred to, and a target engine output torque tTe for the diesel engine 30 is calculated from the engine rotation speed Ne and the load proportion corresponding value Qh0.

Figure 7:
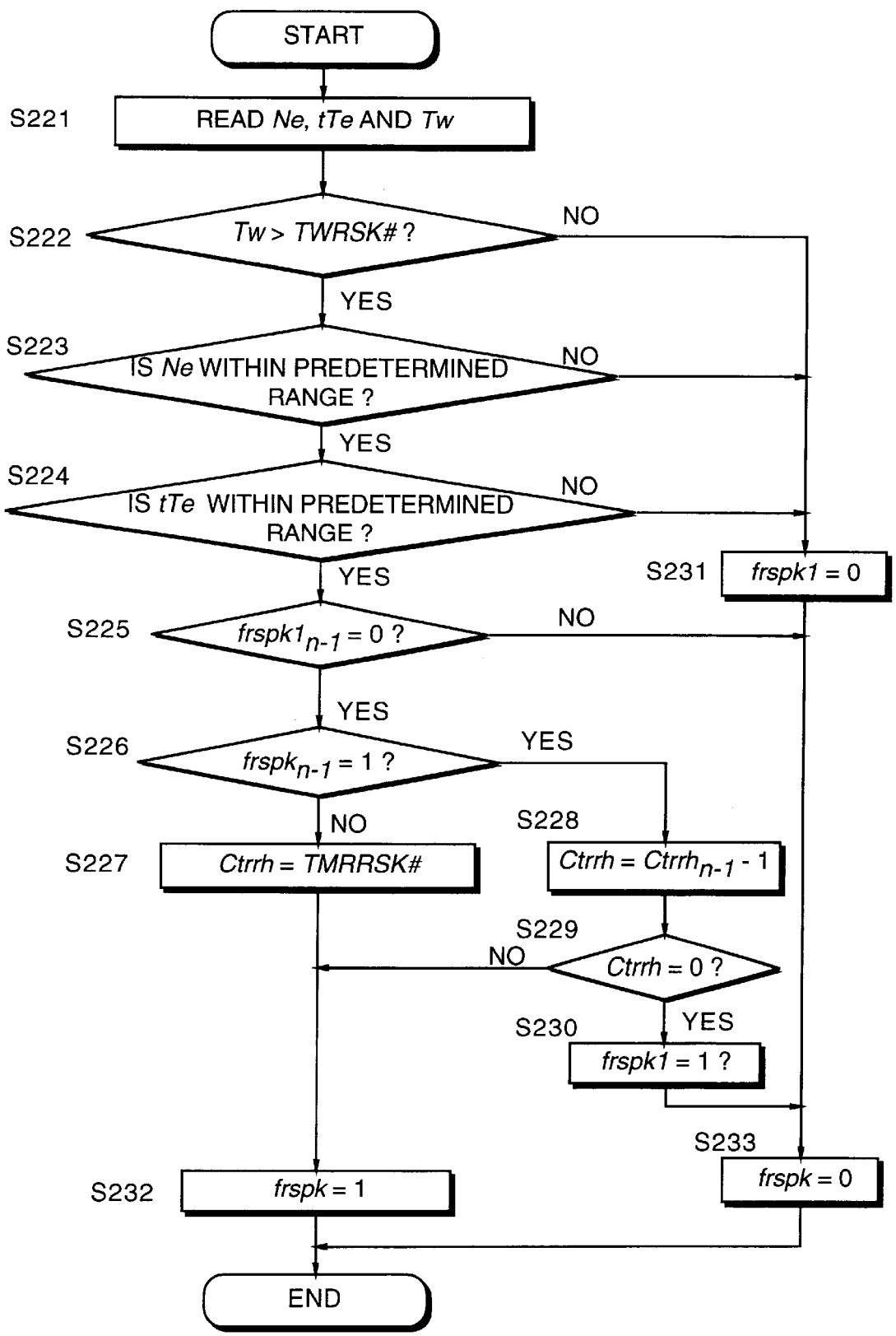
FIG. 7 is a flow chart for explanation of a routine for rich spike determination, executed by the controller.

The controller 20 executes a rich spike determination routine whose flow chart is shown in FIG. 7, using the target engine output torque tTe just obtained.

Referring to FIG. 7, firstly in a step S221, the controller 20 reads the engine rotation speed Ne, target engine output torque tTe calculated by the routine of FIG. 3, and cooling water temperature Tw.

In steps S222 to S224, it is determined whether or not rich spike conditions are satisfied. Specifically, when the cooling water temperature Tw is higher than a predetermined temperature TWRSK#, the engine rotation speed Ne is in a predetermined rotation speed range and the target engine output torque tTe is in a predetermined torque range, it is determined that rich spike conditions are satisfied. For example, when the exhaust gas temperature is low such as in the low load region, reduction of an NOx by HC does not proceed very well, and in this case, as the target engine output torque tTe is below the predetermined torque range, rich spike conditions are not satisfied.

When any of the conditions of the steps S222–S224 is not satisfied, in the step S231, the subroutine resets a rich spike termination flag frspk1 to 0, and in a step S233, the rich spike flag frspk is reset to 0 and the routine is terminated. The rich spike termination flag frspk1 is a flag which shows whether or not rich spike has terminated. When frspk1=1, it shows that rich spike has terminated, and when frspk1=0, it shows that rich spike has not terminated, On the other hand, when all the conditions of the steps S222–S224 are satisfied, it is determined that rich spike conditions are satisfied, and the routine proceeds to a step S225.

In the step S225, it is determined whether or not the immediately preceding value $frspk1_{n-1}$ of the rich spike termination flag is 0. $frspk1_{n-1}$ is the rich spike termination flag set on the immediately preceding occasion when the routine was performed. When the immediately preceding value $frspk1_{n-1}$ is zero, in a step S226, it is determined whether or not the immediately preceding value $frspk_{n-1}$ of the rich spike flag is 1. If the immediately preceding value $frspk_{n-1}$ is not 1, rich spike flag conditions are satisfied for the first time due to the present execution of the routine. In this case, in a step S227, a timer value Ctrrh is set to a predetermined value TMRRSK#, and in a step S232, the rich spike flag frspk is set to 1 and the routine is terminated.

In the step S225, if the immediately preceding value $frspk_{n-1}$ of the rich spike termination flag is not 0, i.e., if it is 1, rich spike has already terminated. In this case, in the step S233, the rich spike flag frspk is reset to 0 and the routine is terminated.

In the step S226, when the immediately preceding value $frspk_{n-1}$ of the rich spike flag is 1, it shows that rich spike conditions are satisfied continuously from the last execution of the routine. In this case, the sub routine proceeds to a step S228, and the timer value Ctrrh is decremented. In a next step S229, it is determined whether or not the timer value Ctrrh is 0.

In the step S229, if the timer value Ctrrh is not 0, the controller 20 sets the rich spike flag frspk to 1 in the step S232, and the routine is terminated. If the timer value Ctrrh is 0 in the step S229, the controller 20 sets the rich spike termination flag frspk1 to 1 in a step S230, resets the rich spike flag frspk to 0 in the step S233, and the routine is terminated.

In this routine, when rich spike conditions are satisfied, if rich spike has not yet been performed, the rich spike flag frspk is set to 1 for a time corresponding to the predetermined value TMRRSK#. After termination of rich spike, the rich spike flag frspk is not set to 1 even if rich spike conditions continue, and the rich spike flag frspk is again set to 1 only when the rich spike conditions have once been unsatisfied and again become satisfied. In this way, rich spike is not performed unnecessarily. Due to this processing, as unnecessary rich spike is not performed, deterioration of fuel cost-performance or exhaust gas composition due to rich spike is suppressed to the minimum.

Figure 8:
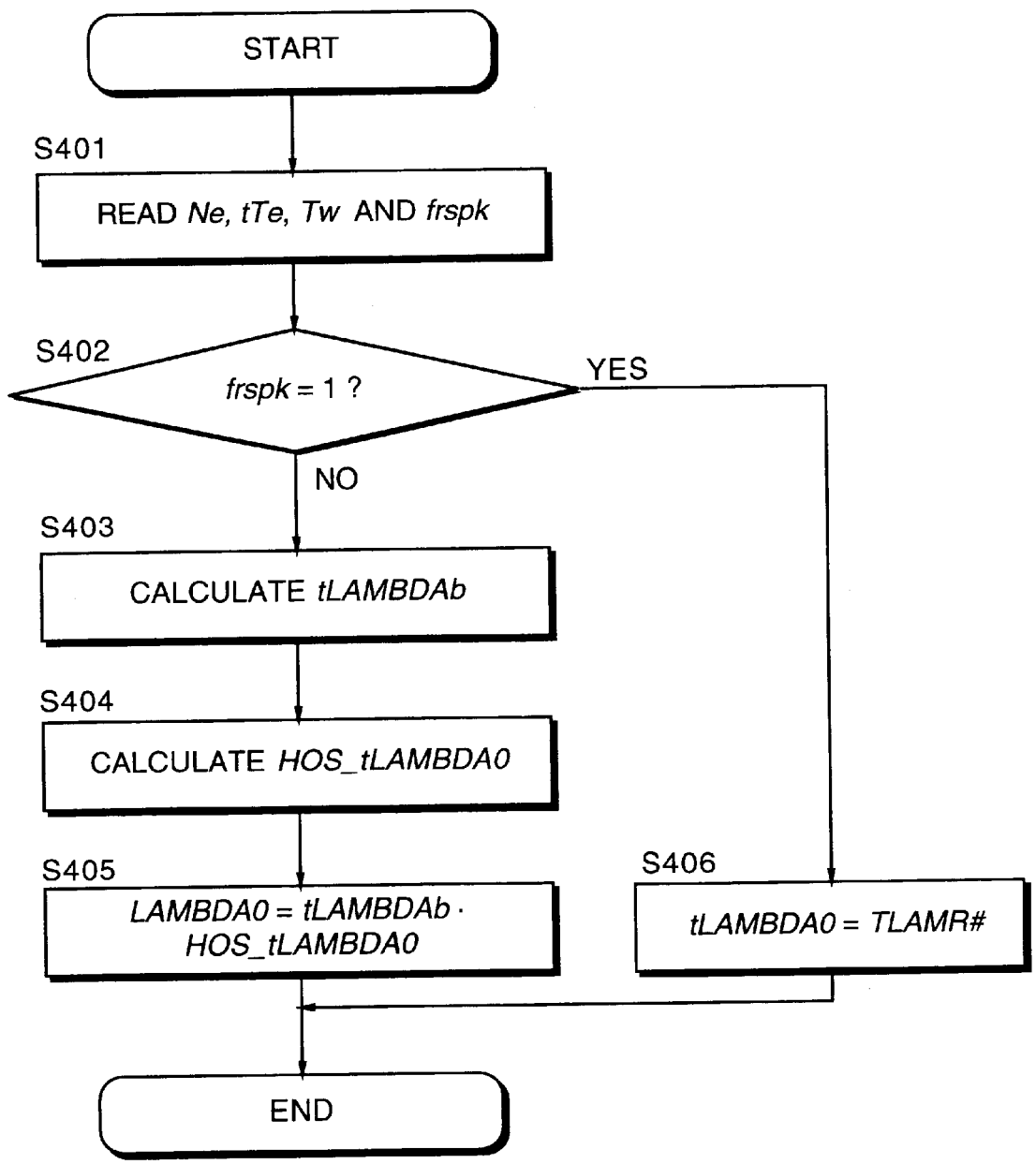
FIG. 8 is a flow chart for explanation of a routine for calculation of a basic target excess air factor tLAMBDA0, executed by the controller.

The controller 20 calculates a basic target excess air factor tLAMBDA0 using a routine whose flow chart is shown in FIG. 8.

Referring to this figure, first in a step S401 the controller 20 reads in the engine rotation speed Ne, the target engine output torque tTe, the engine cooling water temperature Tw, and the rich spike flag frspk.

Next, in a step S402, a decision is taken as to whether or not the rich spike flag frspk is 1, in other words as to whether or not rich spike conditions currently hold. If the rich spike flag frspk is equal to 1, then in a step S406 the routine sets the basic target excess air factor tLAMBDA0 to a constant value TLAMR# which is less than or equal to 1, and then this routine terminates. The fact that the rich spike conditions currently hold means that, as described above, the diesel engine 30 is operating in a specific operational region for the rich spike. Accordingly, in this case, the constant value TLAMR# which corresponds to rich air/fuel ratio is set.

On the other hand, if in the step S402 it is determined that the rich spike flag frspk is not equal to 1, in other words that the rich spike conditions do not currently hold, then this routine executes the procedures given in steps S403 through S405 to determine the basic target excess air factor tLAMBDA0.

Figure 9:
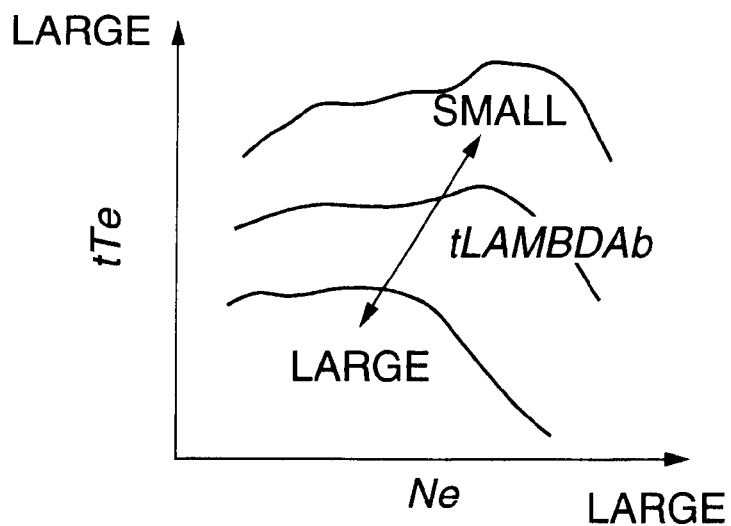
FIG. 9 is a diagram showing a characteristic of a map of a mapped value tLAMBDAb of a basic target excess air factor, stored in the controller.

In the step S403, the mapped value tLAMBDAb of the basic target excess air factor is obtained from the engine rotation speed Ne and the target engine output torque tTe, by referring to a map whose characteristic is shown in FIG. 9 and which is stored internally to the controller 20 in advance.

Figure 10:
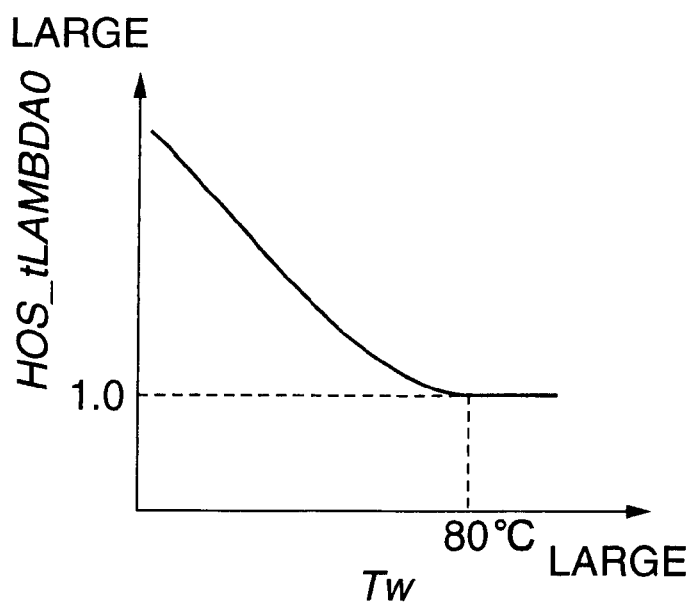
FIG. 10 is a diagram showing a characteristic of a map of a water temperature correction coefficient HOS_tLAMBDA0, stored in the controller.

In the step S404, a water temperature correction coefficient HOS_tLAMBDA0 is obtained from the engine cooling water temperature Tw by referring to a map whose characteristic is shown in FIG. 10.

Next, in the step S405, the basic target excess air factor tLAMBDA0 is calculated from the following Equation (2):

$$tLAMBDA0 = tLAMBDAb \cdot HOS\_tLAMBDA0 \qquad (2)$$

By doing this, the controller 20 executes the procedure for generating the rich spike by setting the basic target excess air factor tLAMBDA0 to the constant value TLAMR#. Furthermore, if the procedure for rich spike generation is not being executed, then the basic target excess air factor tLAMBDA0 is set based upon the engine rotation speed Ne, the target engine output torque tTe, and the engine cooling water temperature Tw.

Figure 11:
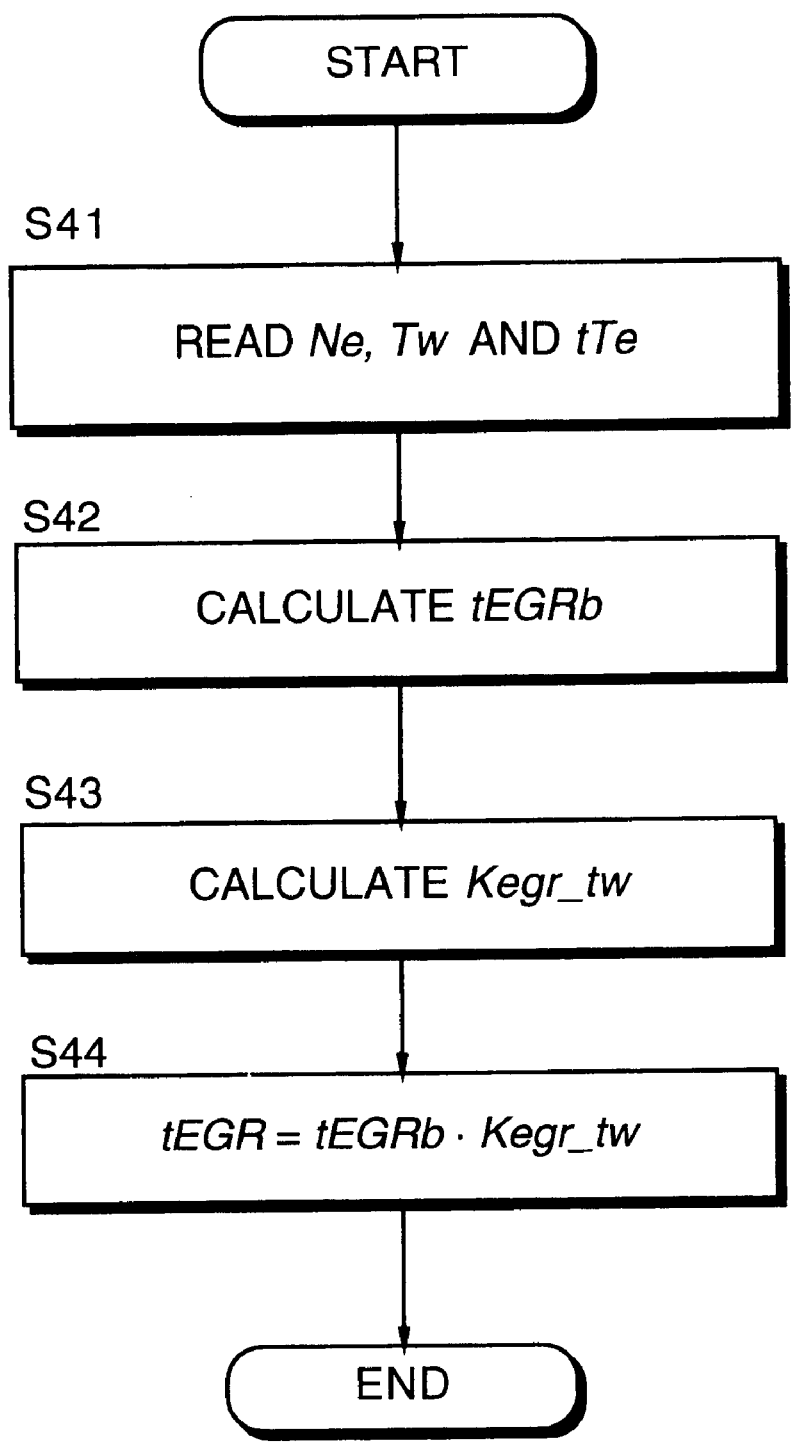
FIG. 11 is a flow chart for explanation of a routine for calculation of a target EGR rate tEGR, executed by the controller.

Furthermore, the controller 20 calculates a target EGR rate tEGR by using a routine whose flow chart is shown in FIG. 11.

Referring to this figure, first in a step S41 the controller reads in the engine rotation speed Ne, the engine cooling water temperature Tw, and the target engine output torque tTe which has been calculated by the routine of FIG. 3.

Figure 12:
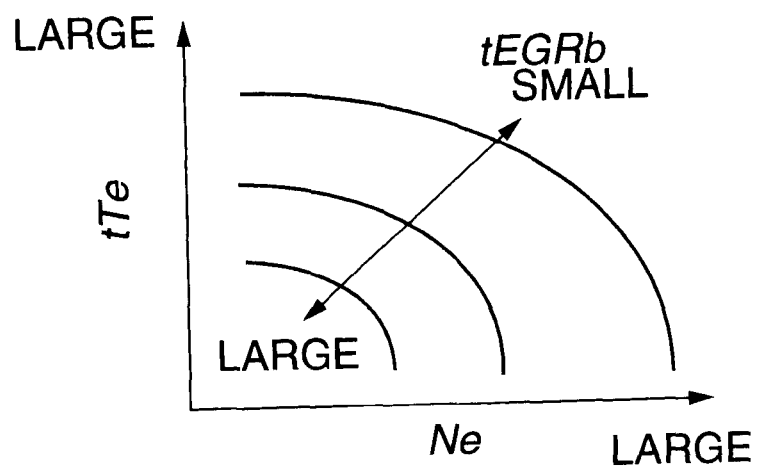
FIG. 12 is a diagram showing a characteristic of a map of a basic target EGR factor tEGRb, stored in the controller.

Next, in a step S42, the basic target EGR rate tEGRb is obtained from the engine rotation speed Ne and the target engine output torque tTe, by referring to the map of which the characteristic is shown in FIG. 12.

Figure 13:
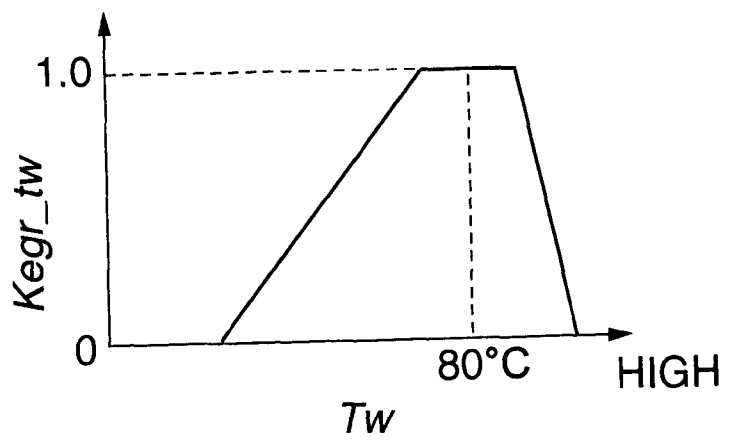
FIG. 13 is a diagram showing a characteristic of a map of a water temperature correction coefficient Kegr_tw, stored in the controller.

Next, in a step S43, a water temperature correction coefficient Kegr_tw is obtained from the engine cooling water temperature Tw, by referring to the map of which the characteristic is shown in FIG. 13.

Next, in a step S44, the target EGR rate tEGR is calculated by using the following Equation (3):

$$tEGR = tEGRb \cdot Kegr\_tw \qquad (3)$$

The controller 20 varies the opening amount of the EGR valve 11 based upon this target EGR rate tEGR, so as to control the EGR rate to the target EGR rate tEGR.

Figure 14:
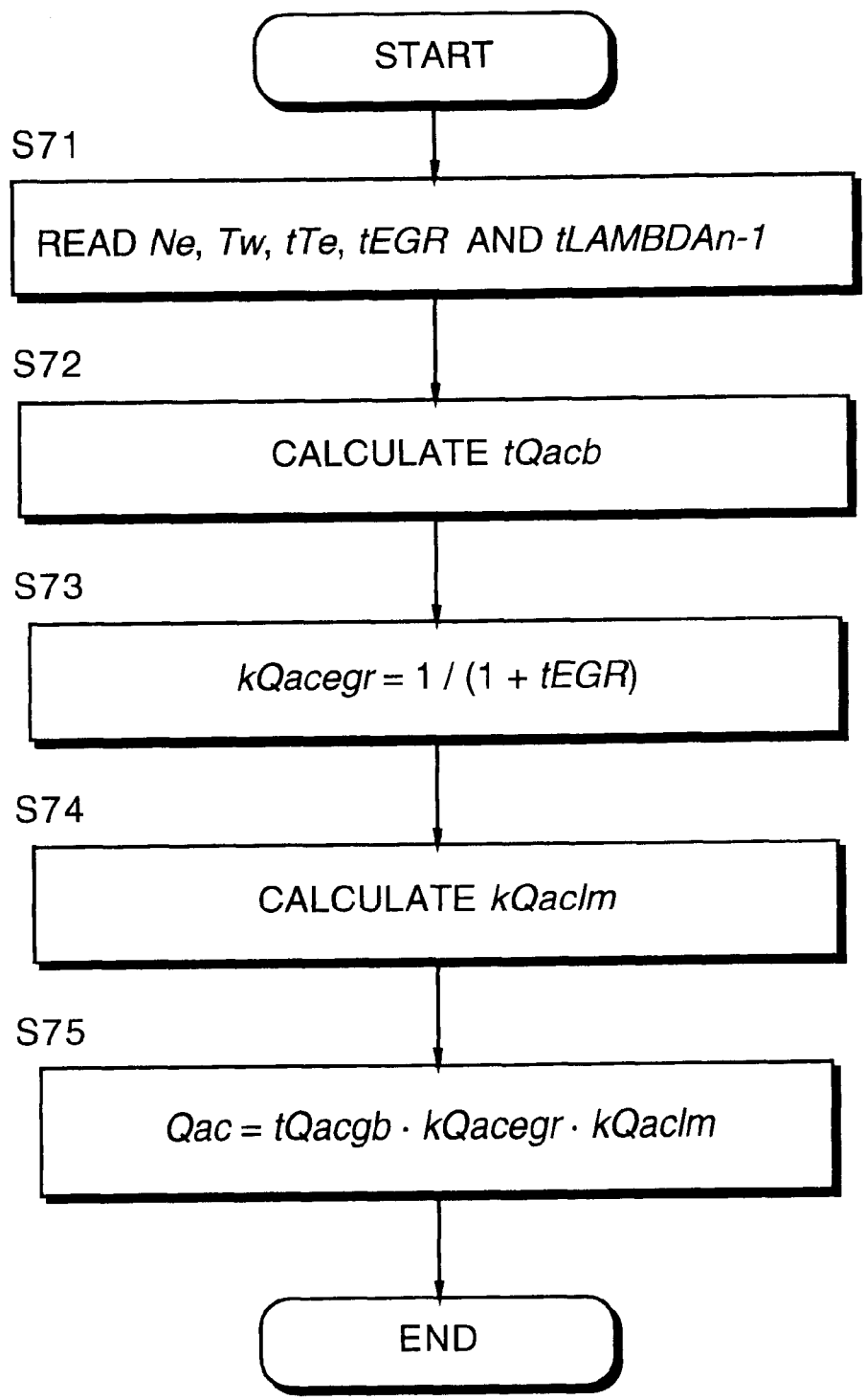
FIG. 14 is a flow chart for explanation of a routine for calculation of a target fresh air intake amount tQac, executed by the controller.

On the other hand, the controller 20 also calculates a target fresh air intake amount tQac using the target engine output torque tTe, the basic target excess air factor tLAMBDA0, and the target EGR rate tEGR, by using a routine of which the flow chart is shown in FIG. 14.

Referring to this figure, first in a step S71 the controller 20 reads in the engine rotation speed Ne, the engine cooling water temperature Tw, the target engine output torque tTe which has been calculated by the routine of FIG. 3 immediately before, the target EGR rate tEGR which has been calculated by the routine of FIG. 11 immediately before, and the previous value $tLAMBDA_{n-1}$ of the target excess air factor.

Figure 2:
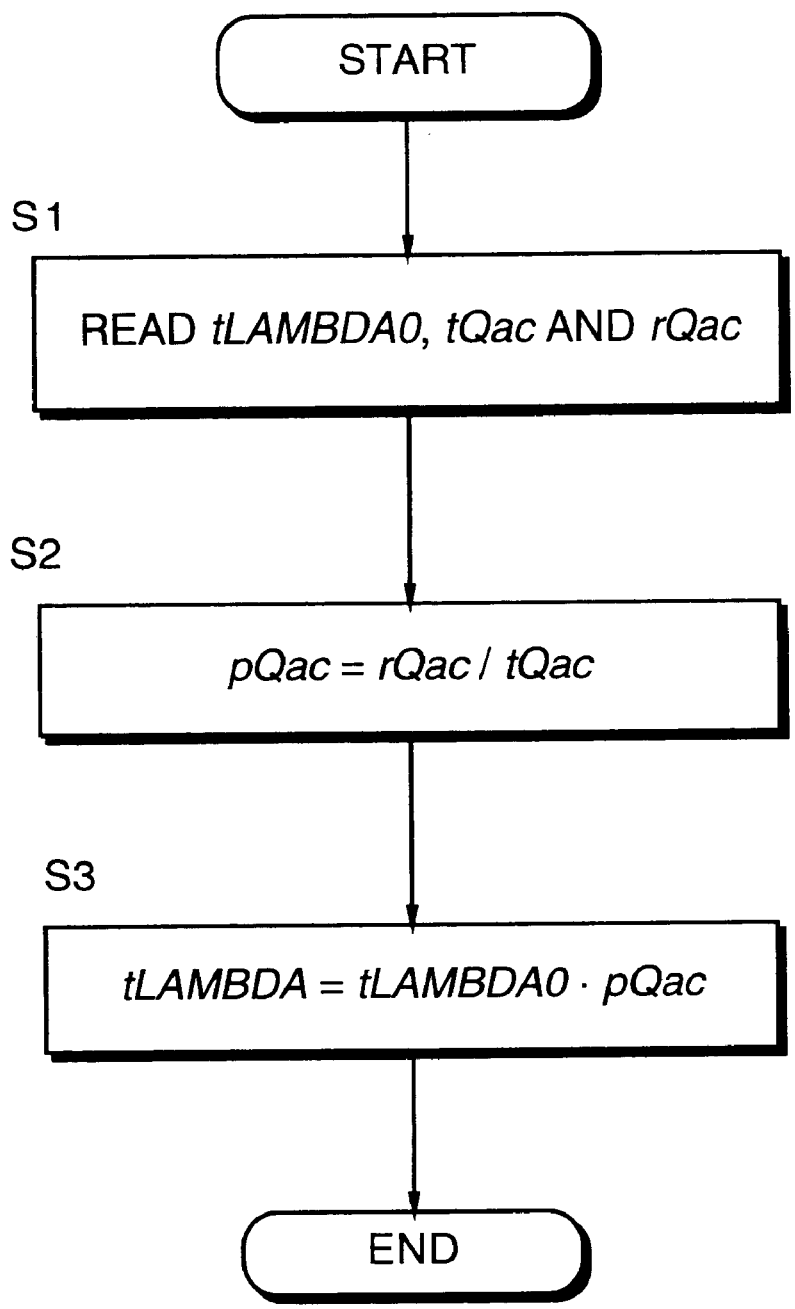
FIG. 2 is a flow chart for explanation of a calculation routine for a target excess air factor tLAMBDA executed by a controller according to this invention.

The target excess air factor tLAMBDA is calculated by a routine whose flow chart is shown in FIG. 2, which will be described hereinafter. In the routine of FIG. 2, the target excess air factor tLAMBDA is calculated using the target fresh air intake amount tQac which is calculated by the routine of FIG. 14. To put it in another manner, the target excess air factor tLAMBDA and the target fresh air intake amount tQac are mutually calculated using their mutual previous values. Because of this, here the target excess air factor tLAMBDA is expressed as $tLAMBDA_{n-1}$ which gives its previous value.

Figure 15:
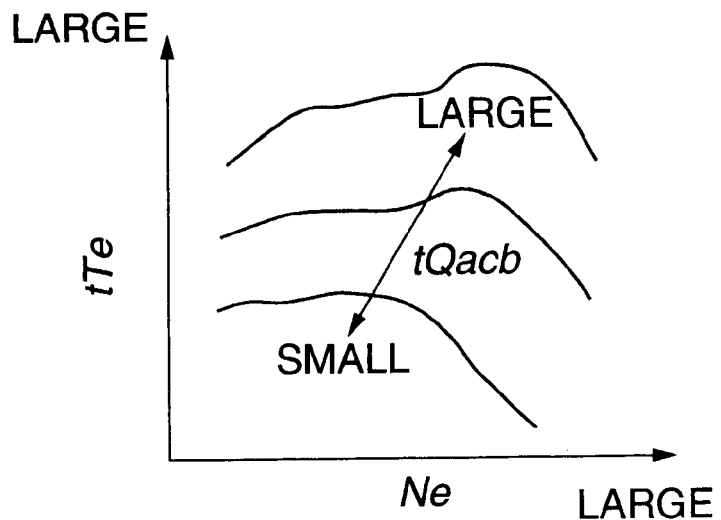
FIG. 15 is a diagram showing a characteristic of a map of a basic target take air amount tQacb, stored in the controller.

Next, in a step S72, a basic target intake air amount tQacb is calculated from the engine rotation speed Ne and the target engine output torque tTe, by referring to a map of which the characteristic is shown in FIG. 15. This basic target intake air amount tQacb is a basic value for the total of the fresh air and the recirculated air which are taken into the cylinder 30A.

Next, in a step S73, an EGR correction coefficient kQacegr is calculated by using the following Equation (4):

$$kQacegr = 1/(1+tEGR) \tag{4}$$

Figure 16:
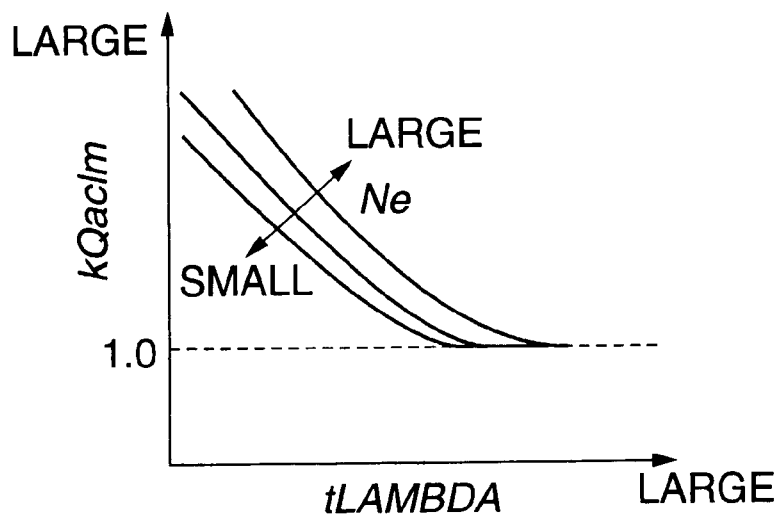
FIG. 16 is a diagram showing a characteristic of a map of an excess air factor torque correction coefficient kQaclm, stored in the controller.

Next, in a step S74, an excess air factor torque correction coefficient kQaclm is obtained from the engine rotation seed Ne and the previous value $tLAMBDA_{n-1}$ of the target excess air factor, by referring to a map of which the characteristic is shown in FIG. 16.

Next, in a step S75, the target fresh air intake amount tQac is calculated by using the following Equation (5):

$$tQac = tQacgb \cdot kQacegr \cdot kQaclm \tag{5}$$

Based upon the target fresh air intake amount tQac which has been calculated in this manner, the controller 20 drives the actuator 1C of the turbocharger 1, so as to control the fresh air intake amount of the diesel engine 30 to be equal to the target fresh air intake amount tQac.

Next, the control of the amount of fuel injected by the fuel injectors 9 will be explained.

Figure 17:
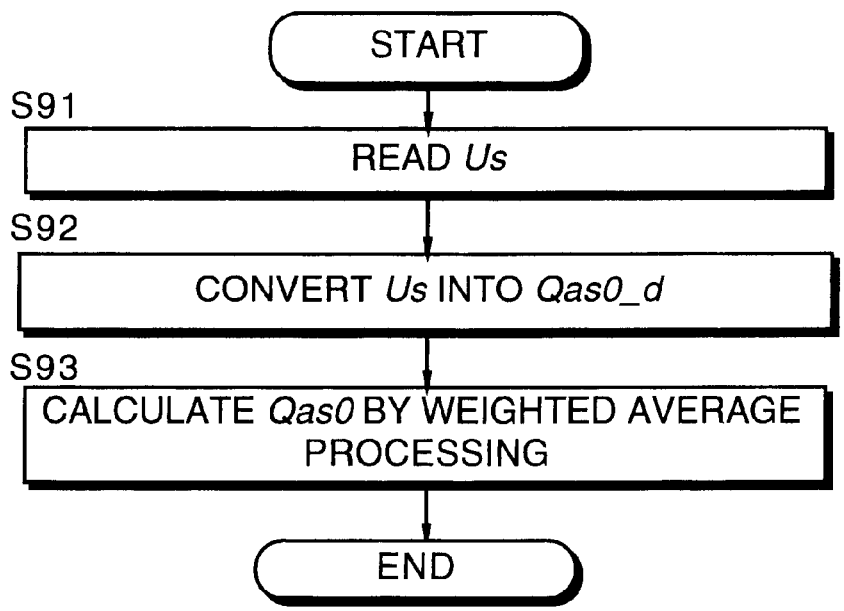
FIG. 17 is a flow chart for explanation of a routine for calculation of a fresh air intake flow amount Qas0, executed by the controller.

The controller 20 first calculates a fresh air intake flow amount Qas0 from the output voltage Us of the air flow meter 16 by using a routine whose flow chart is shown in FIG. 17. This fresh air intake flow amount Qas0 is the flow amount of fresh air in the intake passage 3. The fresh air intake flow amount Qas0 therefore does not include air contained in the recirculated exhaust gas through EGR passage 12.

Referring to FIG. 17, first the controller 20, in a step S91, reads in the output voltage Us of the air flow meter 16.

Figure 18:
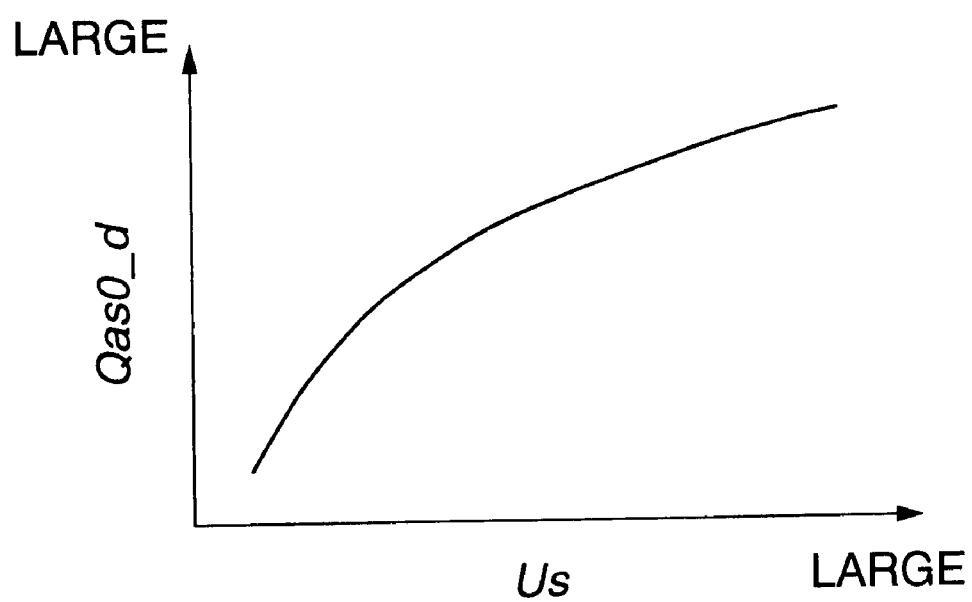
FIG. 18 is a diagram showing a characteristic of a conversion map of an air flow meter output Us to a flow amount Qas0_d, stored in the controller.

Next, in a step S92, the output voltage Us is converted into a flowrate Qas0_d by reference to a map of which the characteristic is shown in FIG. 18.

Next, in a step S93, this flowrate Qas0_d is subjected to a weighted averaging procedure, and the fresh air intake flowrate Qas0 is calculated.

Figure 19:
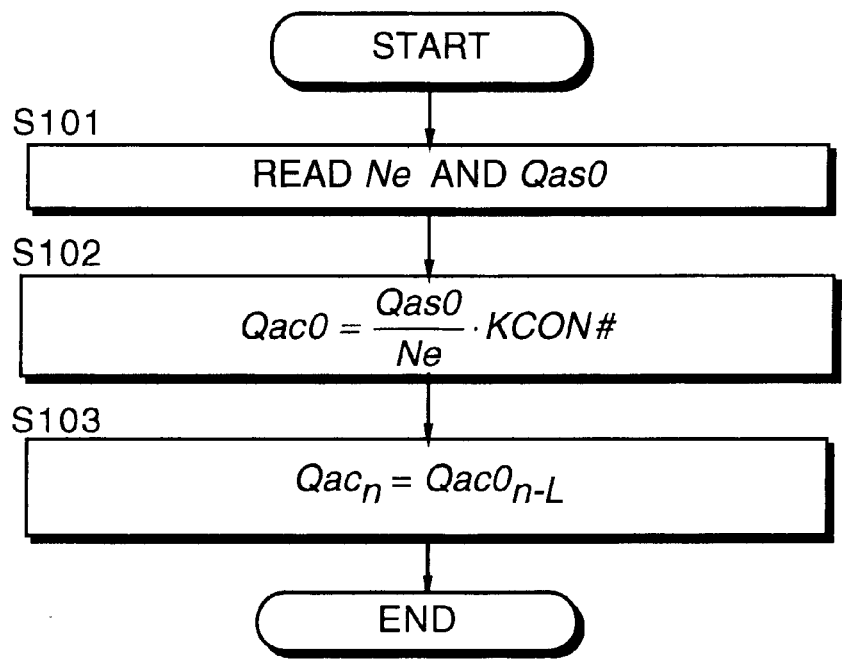
FIG. 19 is a flow chart for explanation of a routine for calculation of a corrected fresh air intake amount $Qac_n$, executed by the controller.

The controller 20 calculates a corrected fresh air intake flow amount $Qac_n$ by employing a routine whose flow chart is shown in FIG. 19, based upon this fresh air intake flowrate Qas0. The gist of this routine is that the flowrate is converted into a fresh air intake amount Qac0 for a single cylinder, and that the fresh air intake amount $Qac_n$ for a single cylinder at the collector 5A is calculated by taking into account the time for the fresh air to arrive at the collector 5A from the air flow meter 16.

First in a step S101 the controller 20 reads in the engine rotation speed Ne and the fresh air intake flowrate Qas0 which has been calculated according to the routine of FIG. 17.

Next in a step S102 the fresh air intake flowrate Qas0 is converted into the fresh air intake amount Qac0 for a single cylinder according to the following Equation (6):

$$Qac0 = \frac{Qas0}{Ne} \cdot KCON\# \tag{6}$$

where, $KCON\#$ = a constant.

This constant KCON# is a constant for converting the fresh air flowrate Qas0 in the intake passage 3 into the air intake amount for a single cylinder. Since in the case of a four cylinder engine two cylinders perform air intake in a single crankshaft revolution, in this case the constant KCON# is equal to 30; while, since in the case of a six cylinder engine three cylinders perform air intake in a single crankshaft revolution, in this case the constant KCON# is equal to 20.

Next, in a step S103, the value $Qac0_{n-L}$ of Qac0 which was obtained during the L-th previous iteration of the above routine is set as the fresh air intake amount $Qac_n$ for a single cylinder at the point of the collector 5A, in consideration of the time period which is required for the air to enter the collector 5A after it has passed through the air flow meter 16. The value of L should be determined as a result of experiment.

Figure 20:
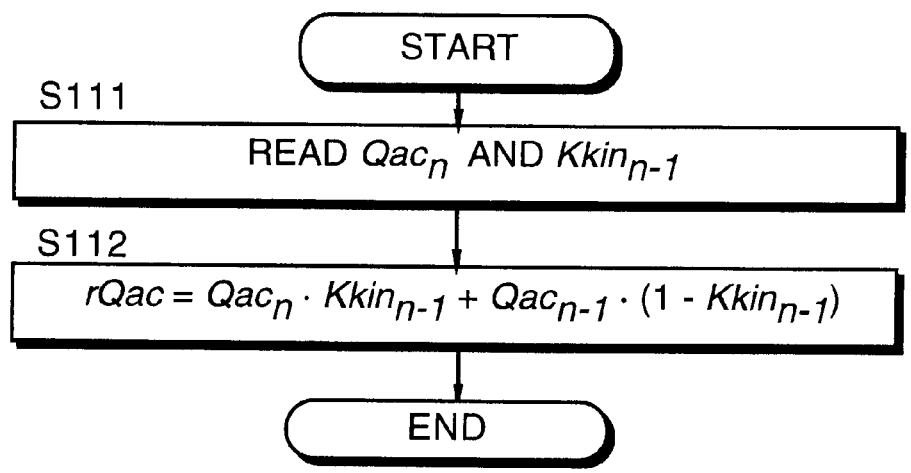
FIG. 20 is a flow chart for explanation of a routine for calculation of a real fresh air intake amount rQac, executed by the controller.
Figure 21:
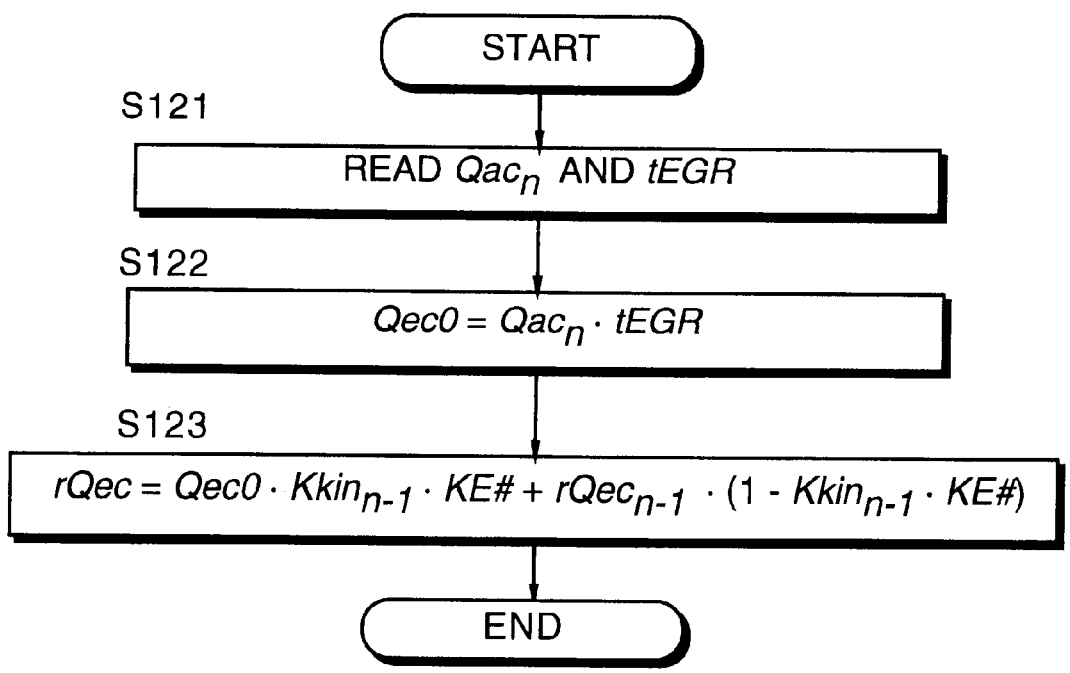
FIG. 21 is a flow chart for explanation of a routine for calculation of a real EGR amount rQec, executed by the controller.
Figure 22:
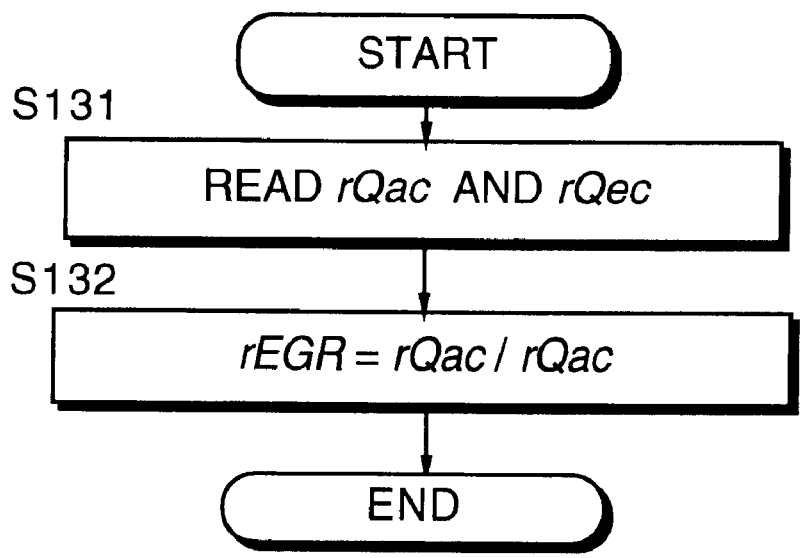
FIG. 22 is a flow chart for explanation of a routine for calculation of a real EGR factor rEGR, executed by the controller.

By using a routine whose flow chart is shown in FIG. 20, the controller 20 calculates a real fresh air intake amount rQac by subjecting the fresh air intake amount $Qac_n$ to a time lag allowance procedure, in consideration of the time required for the air flow from the collector 5A to the cylinders 30A of the engine 30. Furthermore, it calculates the real EGR rate rEGR by using the routines whose flow charts are shown in FIGS. 21 and 22.

Referring to FIG. 20, first in a step S111 the controller 20 reads in the corrected fresh air intake amount $Qac_n$ which has been calculated by the routine of FIG. 19 and also a time constant inverse value $Kkin_{n-1}$. This time constant inverse value Kkin is a value which represents the time period which is required for the fresh air to flow from the collector 5A to the cylinders 30A of the diesel engine 30, and it is calculated according to a routine shown in FIG. 25, as will be described hereinafter.

Figure 25:
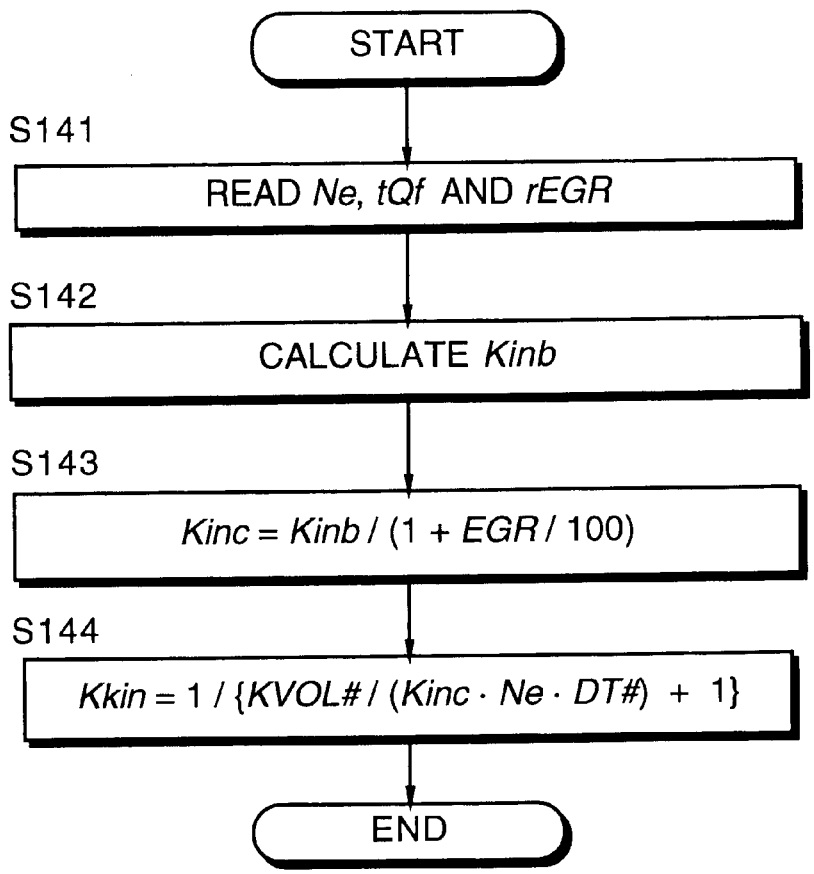
FIG. 25 is a flow chart for explanation of a routine for calculation of a time constant inverse value Kkin, executed by the controller.

In the routine of FIG. 25, the time constant inverse value Kkin is calculated by using the real fresh air intake amount rQac which has been calculated by the routine of FIG. 20. That is to say, on the one hand the real fresh air intake amount rQac is calculated by using the time constant inverse value Kkin, and on the other hand the time constant inverse value Kkin is calculated by using the real fresh air intake amount rQac. Here, for the time constant inverse value Kkin used in the routine of FIG. 20, the value $Kkin_{n-1}$, which means the previous value thereof, is used.

In a next step S112 the controller 20 calculates the real fresh air intake amount rQac by subjecting the corrected fresh air intake amount $Qac_n$ to a first order delay procedure, based upon the time constant inverse value $Kkin_{n-1}$ according to the following Equation (7):

$$rQac = Qac_n \cdot Kkin_{n-1} + Qac_{n-1} \cdot (1 - Kkin_{n-1}) \tag{7}$$

Next, referring to FIG. 21, in a step S121 the controller 20 reads in the corrected fresh air intake amount $Qac_n$ which has been calculated by the routine of FIG. 19, the target EGR rate tEGR which has been calculated by the routine of FIG. 11, and the time constant inverse value Kkin-1 for the previous iteration.

Next, in a step S122, a collector inlet EGR amount Qec0 is calculated by using the following Equation (8):

$$Qec0 = Qac_n \cdot tEGR \tag{8}$$

Next, in a step S123, the real EGR amount rQec is calculated by subjecting the collector inlet EGR amount Qec0 to a first order delay procedure, according to the following Equation (9). This real EGR amount rQec is the real EGR amount for the cylinder 30A of the engine 30 at the position of an intake valve thereof.

$$rQec = Qec0 \cdot Kkin_{n-1} \cdot KE\# + rQec_{n-1}(1 - Kkin_{n-1} \cdot KE\#) \quad (9)$$

where,

KE#=constant, $Kkin_{n-1}$=time constant inverse value Kkin for the previous iteration of the routine of FIG. 25; and $rQec_{n-1}1$=real EGR amount rQec calculated in the previous iteration of this routine.

Next, referring to FIG. 22, in a step S131 the controller 20 reads in the real fresh air intake amount rQac which has been calculated by the routine of FIG. 20 and the real EGR amount rQec which has been calculated by the routine of FIG. 21.

Next, in a step S132, the real EGR rate rEGR is calculated according to the following Equation (10). This real EGR rate rEGR is used in the calculation of the time constant inverse value Kkin, as will be described hereinafter.

$$rEGR = rQec/rQac \quad (10)$$

The controller 20 calculates the target excess air factor tLAMBDA using a routine whose flow chart is shown in FIG. 2, in order to calculate a target fuel injection amount for the fuel injectors 9.

Referring to this figure, first in a step S1 the controller 20 reads in the basic target excess air factor tLAMBDA0 which has been obtained by the routine of FIG. 8, the target fresh air intake amount tQac which has been calculated by the routine of FIG. 14, and the real fresh air intake amount rQac which has been calculated by the routine of FIG. 20.

Next in a step S2 a fresh air intake amount ratio pQac is calculated as the ratio of the real fresh air intake amount rQac and the target fresh air intake amount tQac. Since in a rich spike the real fresh air intake amount rQac tracks reduction of the target fresh air intake amount tQac with a certain delay, therefore in this case the fresh air intake amount ratio pQac has a value greater that 1.

In a next step S3, the target excess air factor tLAMBDA is calculated by multiplying the fresh air intake amount ratio pQac by the basic target excess air factor tLAMBA0. Accordingly, during a rich spike, the target excess air factor tLAMBDA has a value greater than that of the basic target excess air factor tLAMBDA0.

Figure 23:
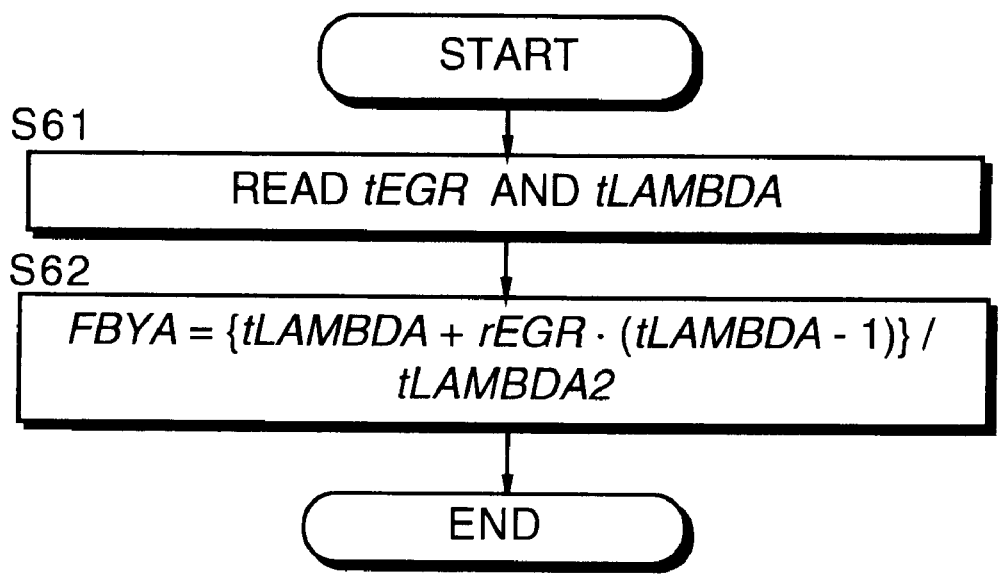
FIG. 23 is a flow chart for explanation of a routine for calculation of a target equivalence ratio tFBYA, executed by the controller.

The controller 20 calculates a target equivalence ratio tFBYA based upon the target excess air factor tLAMBDA, by executing the routine whose flow chart is shown in FIG. 23. This equivalence ratio is defined in the following manner, based upon the disclosure to be found in the volume "Internal Combustion Engines" by John B. Heywood (ISBN 0-07-028637-X).

Equivalence ratio=fuel/air ratio/stoichiometric fuel/air ratio

The fuel/air ratio is the inverse of the air/fuel ratio. The equivalence ratio which corresponds to the stoichiometric air/fuel ratio is 1. In the case of a lean air/fuel ratio, in other words when the excess air factor is greater than 1, the equivalence ratio is less than 1; while, in the case of a rich air/fuel ratio, in other words when the excess air factor is less than 1, the equivalence ratio is greater than 1.

Referring to FIG. 23, first in a step S61 the controller 20 reads in the target EGR rate tEGR which has been calculated by the routine of FIG. 1, and the target excess air factor tFBYA which has been calculated by the routine of FIG. 2.

Next in a step S62 the target equivalence ratio tFBYA is calculated by the following Equation (11):

$$tFBYA = \{tLAMBDA + rEGR \cdot (tLAMBDA - 1)\}/tLAMBDA^2 \quad (11)$$

This equation (11) is an approximate equation based upon the following considerations.

The excess air factor is generally defined as the value obtained by dividing the air/fuel ratio by the theoretical air/fuel ratio, according to the following Equation (12):

$$LAMBDA = Ga/(Gf \cdot 14.6) \quad (12)$$

where,

Ga=fresh air amount, and

Gf=fuel injection amount.

However, with a diesel engine which is operating in the excess air condition, which is often the case, a portion of the fresh air is not subjected to combustion, and is discharged just as it is. As a result, when exhaust recirculation is performed in the excess air condition, a certain amount of air comes to be included in the EGR gas.

The excess air factor LAMBDA is given by the following Equation (13), in consideration of the amount of fresh air included in the EGR gas $$LAMBDA = \{Ga + Ge \cdot (LAMBDA - 1)/LAMBDA\}/(Gf \cdot 14.6) \quad (13)$$

where, Ge=EGR amount.

The value LAMBDA/(LAMBDA−1) gives the proportion of air in the EGR gas.

It is possible to transform Equation (13) into the following Equation (14):

$$LAMBDA = Ga \cdot \{1 + (Ge/Ga) \cdot (LAMBDA-1)/LAMBDA\}/(Gf \cdot 14.6) = \{Ga/(Gf \cdot 14.6)\} \cdot \{1 + (Ge/Ga) \cdot (LAMBDA-1)/LAMBDA\} \quad (14)$$

On the other hand, the equivalence ratio FBYA is defined by the following Equation (15):

$$FBYA = Gf \cdot 14.6/Ga \quad (15)$$

Although, theoretically, the fresh air amount Ga of Equation (15) must be a value including the amount of air which is included in the EGR gas, the equivalence ratio FBYA is approximately defined by Equation (15) in this control device for the purpose of simplifying the calculation.

The expression Ga/(Gf*14.6) on the right side of Equation (14) is equal to 1/FBYA, and Ge/Ga corresponds to the real EGR rate rEGR. When these are substituted into Equation (14), the following Equation (16) is obtained:

$$LAMBDA = (1/FBYA) \cdot \{1 + rEGR \cdot (LAMBDA-1)/LAMBDA\} \quad (16)$$

When Equation (16) is rearranged to give the equivalence ratio FBYA, the following Equation (17) is obtained:

$$FBYA = (1/LAMBDA) \cdot \{1 + rEGR \cdot (LAMBDA-1)/LAMBDA\} = 1 + rEGR \cdot (LAMBDA-1)/LAMBDA^2 \quad (17)$$

When, in Equation (17), the equivalence ratio FBYA is substituted for the target equivalence ratio tFBYA, and the excess air factor LAMBDA is substituted for the target excess air factor tLAMBDA, this yields Equation (11). Since directly after a rich spike the target equivalence ratio tFBYA is calculated by using the target excess air factor tLAMBDA which has been obtained by increasing the basic target excess air factor tLAMBDA0, the target equivalence ratio tFBYA has a value which is leaner than the equivalence ratio which corresponds to the rich spike.

Figure 24:
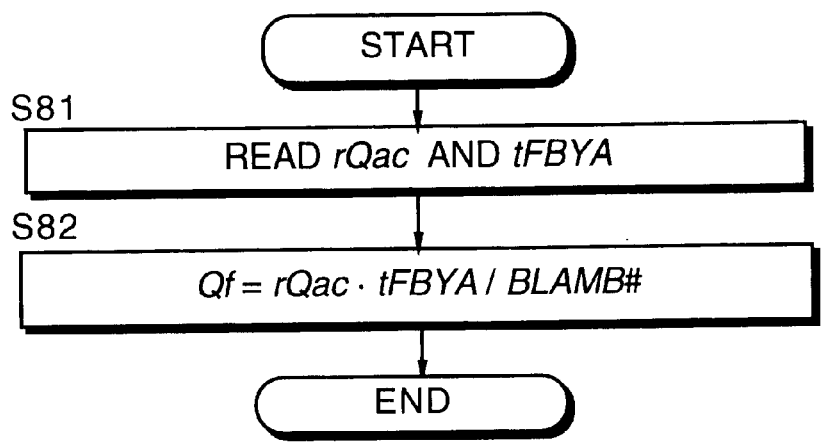
FIG. 24 is a flow chart for explanation of a routine for calculation of a target fuel injection amount tQf, executed by the controller.

After having calculated the target equivalent ratio tFBYA by the routine of FIG. 23, the controller 20 calculates the target fuel injection amount tQf by using the routine whose flow chart is shown in FIG. 24.

Referring to FIG. 24, first in a step S81 the controller 20 reads in the real fresh air intake amount rQac which has been calculated by the routine of FIG. 20, and the target equivalence ratio tFBYA which has been calculated by the routine of FIG. 23.

Next, in a step S82, the target fuel injection amount tQf is calculated according to the following Equation (18):

$$tQf = rQac \cdot tFBYA / BLAMB\# \tag{18}$$

where, BLAMB#=constant.

The controller 20 controls the fuel injection amount from the fuel injectors 9 to be equal to the target fuel injection amount tQf by outputting a duty ratio signal to the fuel injectors 9 based upon this target fuel injection amount tQf. Since the target equivalence ratio tFBYA is corrected in the direction to be leaner than the value which is appropriate for the rich spike, this target fuel injection amount tQf has a value which is less than the fuel injection amount during the rich spike.

Finally, the calculation routine for the time constant inverse value Kkin for the air intake lag will be explained with reference to the flow chart shown in FIG. 25.

This time constant inverse value Kkin is a value which represents the time period which is required for the fresh air to flow from the collector 5A of the diesel engine 30 to the cylinders 30A thereof, and it is used in the routines of FIGS. 20 and 21 described above.

First in a step S141 the controller 20 reads in the engine rotation speed Ne, the target fuel injection amount tQf which has been calculated by the routine of FIG. 24, and the real EGR rate rEGR which has been calculated by the routine of FIG. 22.

Figure 26:
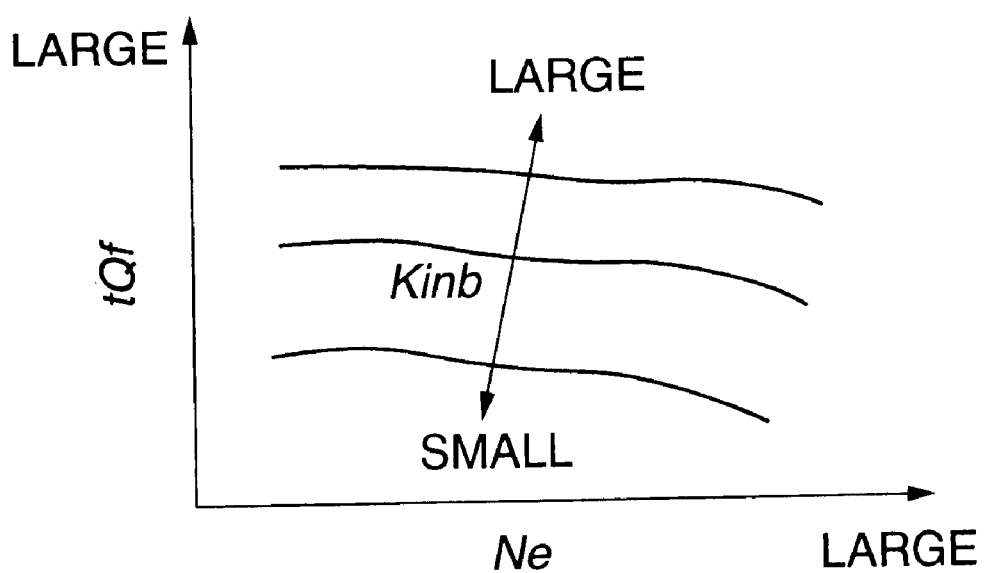
FIG. 26 is a diagram showing a characteristic of a map of a volumetric efficiency equivalent basic value Kinb, stored in the controller.

Next, in a step S142, a volumetric efficiency equivalent basic value Kinb is obtained from the engine rotation speed Ne and the target fuel injection amount tQf by referring to a map whose characteristic is shown in FIG. 26.

Next, in a step S143, a volumetric efficiency corresponding value Kinc is calculated according to the following Equation (19). Since the proportion of fresh air which is taken into the cylinder 30A drops when EGR is being performed, the volumetric efficiency diminishes. Here, in the calculation of volumetric efficiency, the volumetric efficiency corresponding value Kinc is calculated in order to reflect this diminution.

$$Kinc = Kinb / (1 + EGR/100) \tag{19}$$

Next, in a step S144, the time constant inverse value Kkin for the air intake lag is calculated according to the following Equation (20):

$$Kkin = \frac{1}{\frac{KVOL\#}{Kinc \cdot Ne \cdot DT\#} + 1} \tag{20}$$

where, $KVOL\# = 120 \cdot VC / VE$,

VC = volume of the collector 5A,

VE = exhaust gas volume from the cylinder 30A, and

DT# = sampling time (calculation interval).

The time constant inverse value Kkin which has been calculated in this manner is used as the time constant inverse value $Kkin_{n-1}$ in the calculation of the real fresh air intake amount rQac and the real EGR rate rQec when the routines of FIGS. 20 and 21 are executed in the next occasion.

When executing each of the above described routines, the controller 20 controls the fuel injection amount provided by the fuel injectors 9 by setting the target fuel injection amount tQf based upon the target excess air factor tLAMBDA. When creating a rich spike in order to regenerate the NOx trapping performance of the catalyst, the target excess air factor tLAMBDA is changed over to a value for rich spike. If the target excess air factor tLAMBDA abruptly changes at this time, torque variation can easily be caused by differences in the response of the fresh air intake amount and the fuel injection amount.

However, since the controller 20 sets the target excess air factor tLAMBDA in correspondence to the fresh air intake amount ratio pQac, thereby the fresh air intake amount and the fuel injection amount vary in good mutual balance, and accordingly the output torque of the diesel engine 30 does not vary unduly.

Next a second embodiment of this invention will be explained with reference to FIGS. 27 and 28.

Figure 27:
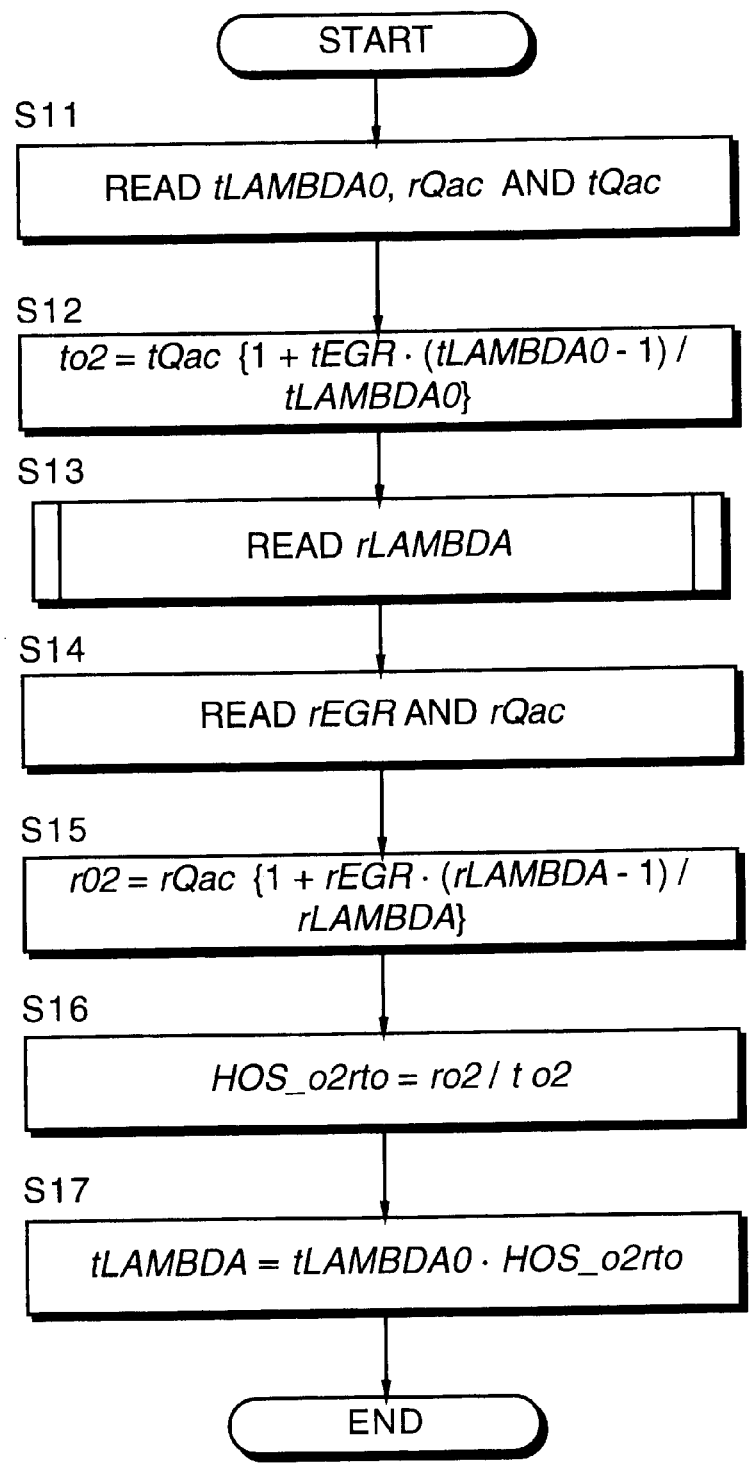
FIG. 27 is a flow chart for explanation of a routine for calculation of the target excess air factor tLAMBDA, executed by a controller according to a second embodiment of this invention.

In the second embodiment, the routine whose flow chart is shown in FIG. 27 is used for calculation of the target excess air factor tLAMBDA, instead of the routine of FIG. 2. Just as in the case of the first embodiment, this routine also is executed every ten milliseconds while the diesel engine 30 is operating.

Referring to FIG. 27, first in a step S11 the controller 20 reads in the basic target excess air factor tLAMBDA0, the real fresh air intake amount rQac, and the target fresh air intake amount tQac. The calculation processes for obtaining these values are the same as in the case of the first preferred embodiments.

Next in a step S12 a target intake air amount corresponding value to2 which corresponds to the basic target excess air factor tLAMBDA0 is calculated using the following Equation (21):

$$to2 = tQac \cdot \{1 + tEGR \cdot (tLAMBDA0 - 1) / tLAMBDA0\} \tag{21}$$

In Equation (21), the expression (tLAMBDA0−1)/tLAMBDA0 gives the proportion of air in the exhaust gas. The amount of air in the EGR gas is obtained by multiplying this proportion by the target EGR rate tEGR and the target fresh air intake amount tQac. Furthermore, the target intake air amount corresponding value to2 in the cylinders 30A, which consists of the fresh air intake amount and the amount of air in the EGR gas, is calculated by adding the amount of air in the exhaust gas to the target fresh air intake amount tQac.

Next, in a step S13, the real excess air factor rLAMBDA is read in. The real excess air factor rLAMBDA is the excess air factor in the cylinder 30A which includes the air in the EGR gas, and it is calculated according to a subroutine whose flow chart is shown in FIG. 28.

There is a certain time lag from when the amount of fresh air which is being aspirated into the cylinders 30A varies, to when the air amount in the EGR gas which are being aspirated into the cylinders 30A varies. In other words, there is a certain time lag from when the excess air in the cylinders 30A is exhausted into the exhaust manifold 10 as exhaust gas, to when it again flows into the cylinders 30A via the EGR passage 12 and the collector 5A. In the subroutine of FIG. 28, the real excess air factor rLAMBDA is calculated while taking into account this time lag, which is the sum of the dead time and the first order delay.

Figure 28:
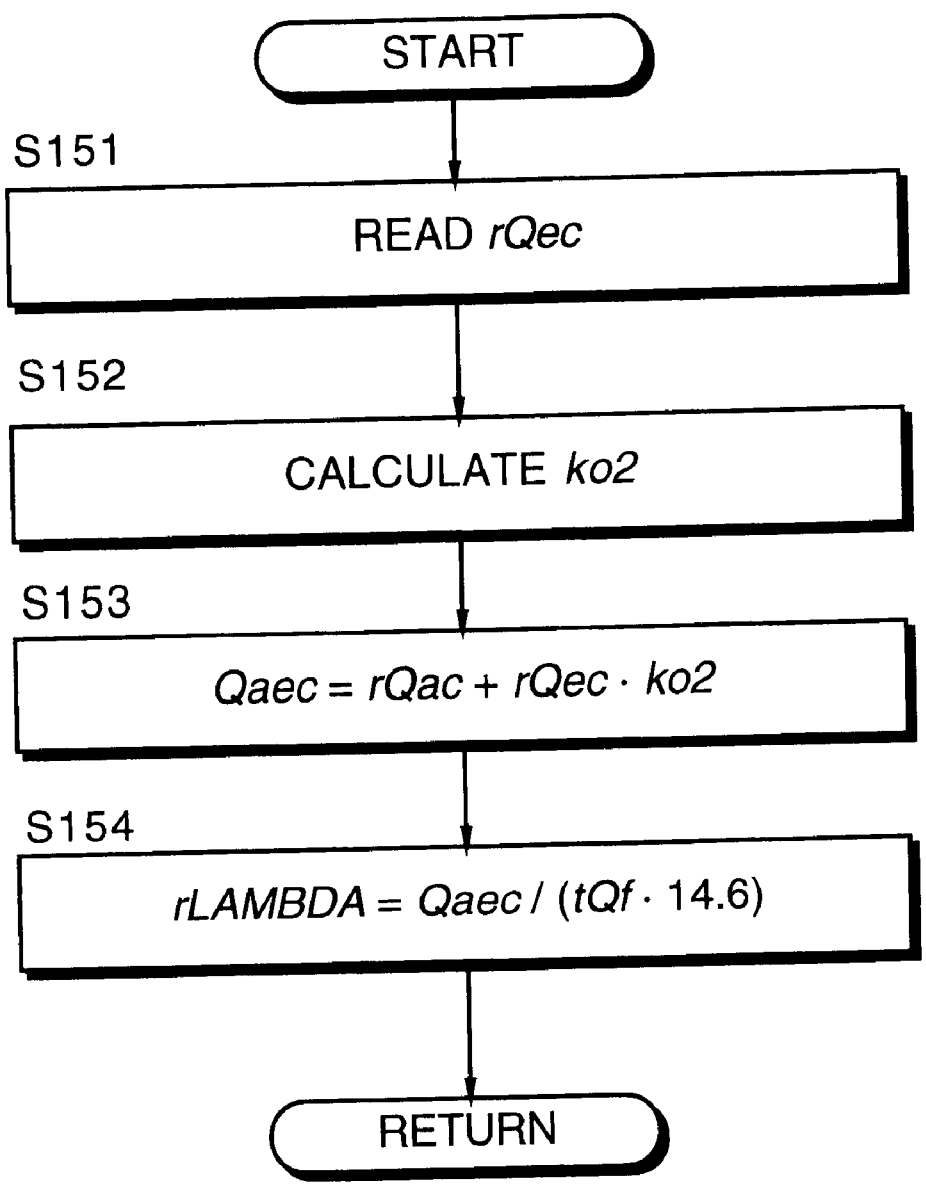
FIG. 28 is a flow chart for explanation of a routine for calculation of the real excess air factor rLAMBDA, executed by the controller according to the second preferred embodiment of this invention.

Referring to FIG. 28, first in a step S151 the controller 20 reads in the real EGR amount rQec which has been calculated by the routine of FIG. 21.

Next in a step S152, in consideration of the dead time, the basic proportion ko0 of air in the EGR gas is calculated as the proportion of air in the exhaust when this routine was executed the L-th time previously, according to the following Equation (22):

$$ko0 = \frac{rLAMBDA_{n-L} - 1}{rLAMBDA_{n-L}} \qquad (22)$$

where, $rLAMBDA_{n-L}$ = the value of $rLAMBDA$ which was calculated during the L-th previous iteration of this routine.

Furthermore, an air proportion ko2 in the EGR gas is calculated by applying the first order delay process based upon a time constant inverse value #Ts to the basic proportion ko0 of air in the EGR gas, according to the following Equation (23):

$$ko2 = \left(\frac{rLAMBDA_{n-L} - 1}{rLAMBDA_{n-L}}\right) \cdot \#Ts + \left(\frac{rLAMBDA_{n-(L+1)} - 1}{rLAMBDA_{n-(L+1)}}\right) \cdot (1 - \#Ts) \qquad (23)$$

where, $rLAMBDA_{n(L+1)}$ = the value of $rLAMBDA$ which was calculated during the (L+1)-th previous iteration of this routine.

Next in a step S153 the total amount of air aspirated into the cylinders Qaec is calculated according to the following Equation (24):

$$Qaec = rQac + rQec \cdot ko2 \qquad (24)$$

where, rQac=the real fresh air intake amount, and rQec=the real EGR amount.

Next in a step S154 the air/fuel ratio is obtained by dividing the total amount of air aspirated into the cylinders Qaec by the target fuel injection amount tQf, according to the following Equation (25). Further, the real excess air factor rLAMBDA is calculated by dividing the air/fuel ratio by 14.6.

$$rLAMBDA = Qaec/(tQf \cdot 14.6) \qquad (25)$$

The initial value of the air proportion in the EGR gas ko2 is zero, and accordingly the initial value of rLAMBDA is Qac/(tQf·14.6).

After calculating the real excess air factor rLAMBDA by the subroutine of FIG. 28, the controller executes the procedures from a step S14 of the FIG. 27.

In the step S14, the controller 20 reads in the real EGR rate rEGR which has been calculated by the routine of FIG. 22 and the real fresh air intake amount rQac which has been calculated by the routine of FIG. 20.

In a next step S15, a real intake air amount corresponding value ro2 is calculated according to the following Equation (26), which resembles the previous Equation (21):

$$ro2 = rQac \cdot \{1 + rEGR \cdot (rLAMBDA - 1)/rLAMBDA\} \qquad (26)$$

In a next step S16, the ratio of the real intake air amount corresponding value ro2 and the target intake air amount corresponding value to2 which was obtained in the step S12 is calculated and is set as the intake air amount ratio HOS_o2rto. This intake air amount ratio HOS_o2rto corresponds to the fresh air intake amount ratio pQac of the first embodiment, described above.

Next in a step S17, just as in the step S3 of the routine of FIG. 2, the target excess air factor tLAMBDA is calculated according to the following Equation (27):

$$tLAMBDA = tLAMBDA0 \cdot HOS\_o2rto \qquad (27)$$

In the first embodiment of this invention, the target excess air factor tLAMBDA was calculated based upon the ratio of the real fresh air intake amount rQac and the target fresh air intake amount tQac, but in this embodiment, taking into consideration the amount of air included in the EGR gas, the target excess air factor tLAMBDA is calculated based upon the ratio of the real intake air amount corresponding value ro2 and the target intake air amount corresponding value to2.

According to this embodiment, therefore, it is possible to control the target excess air factor tLAMBDA with greater accuracy.

Next a third embodiment of this invention will be explained with reference to FIGS. 29 and 30.

Figure 29:
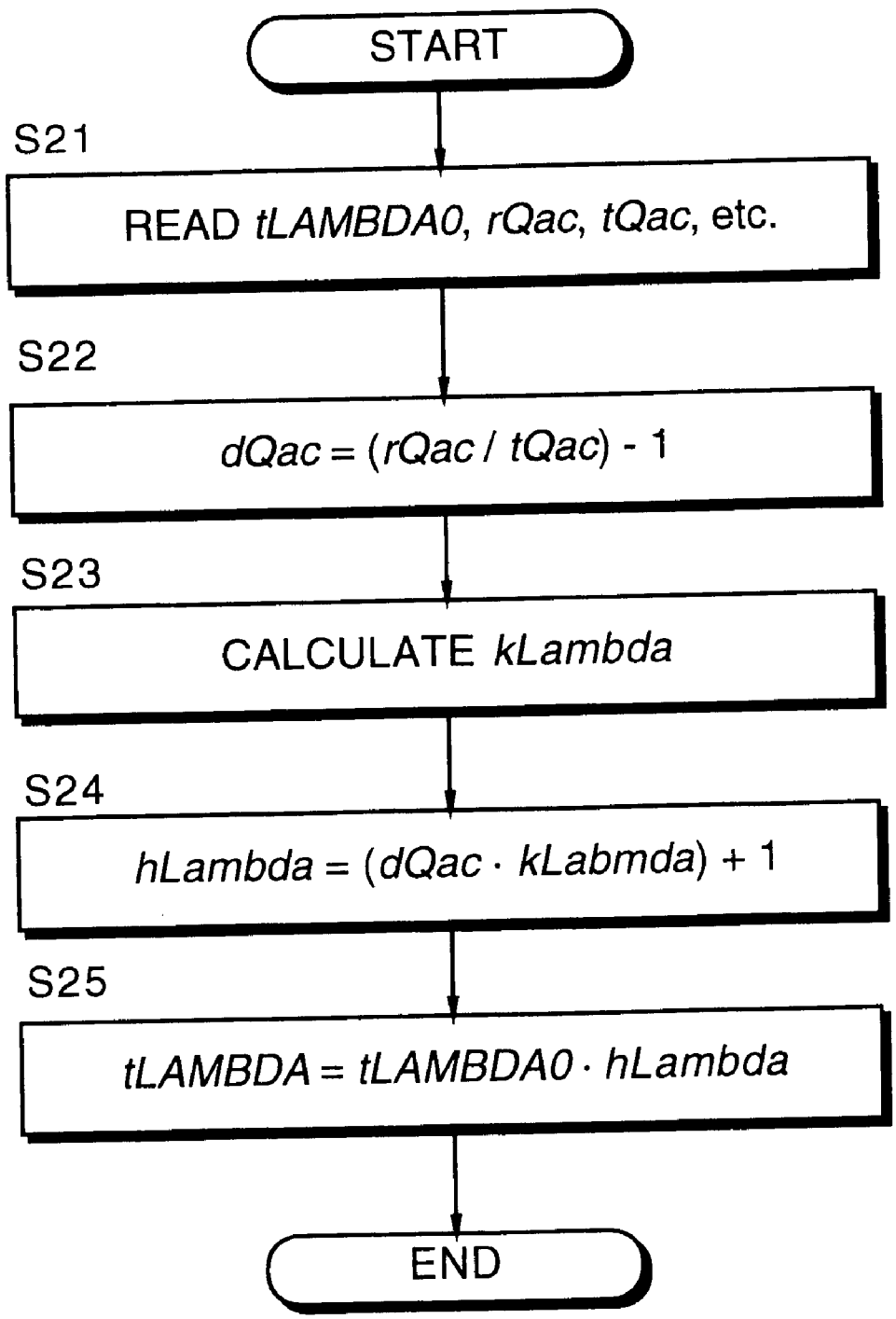
FIG. 29 is a flow chart for explanation of a routine for calculation of the target excess air factor tLAMBDA, executed by a controller according to a third embodiment of this invention.

In the third embodiment, the routine whose flow chart is shown in FIG. 29 is used for calculation of the target excess air factor tLAMBDA, instead of the routine of FIG. 2. This routine also is executed at periodic intervals of ten milliseconds while the diesel engine 30 is operating.

Referring to FIG. 29, first in a step S21 the controller 20 reads in the basic target excess air factor tLAMBDA0, the real fresh air intake amount rQac, and the target fresh air intake amount tQac. These values are calculated by processes identical to those utilized in the first embodiment as described above.

Next, in a step S22, a fresh air intake amount error proportion dQac is calculated by using the following Equation (28):

$$dQac = (rQac/tQac) - 1 \qquad (28)$$

For example, if the air/fuel ratio has been enriched in order to regenerate the NOx trapping capability of the catalyst, the target fresh air intake amount tQac diminishes, while the real fresh air intake amount rQac diminishes with a predetermined lag with respect to the target fresh air intake amount tQac. Accordingly, the real fresh air intake amount rQac is greater than the target fresh air intake amount tQac, and thus in this case the fresh air intake amount error proportion dQac has a positive value.

Figure 30:
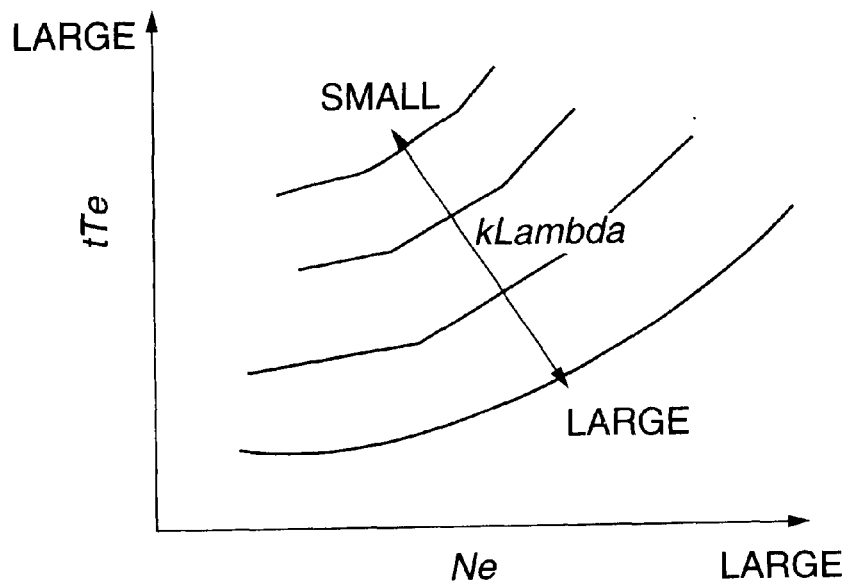
FIG. 30 is a diagram showing a characteristic of a map of an excess air factor correction gain kLambda, stored in the controller according to the third embodiment of this invention.

Next, in a step S23, the controller 20 obtains an excess air factor correction gain kLambda, based upon the engine rotation speed Ne and the target engine output torque tTe, by referring to a map previously stored internally to the controller 20 of which the characteristic is shown in FIG. 30. In FIG. 30, the correction gain kLambda is set so as to have a value which is the greater, the less is the load upon the diesel engine 30, in other words the less is the target engine output torque tTe.

Next, in a step S24, a correction ratio hLambda is calculated according to the following Equation (29):

$$hLambda=(dQac \cdot kLabmda)+1 \quad (29)$$

If the air/fuel ratio is enriched, since the fresh air intake amount error proportion dQac has a positive value, this correction ratio hLambda has a value which is greater than 1.

Next, in a step S25, the target excess air factor tLAMBDA is calculated according to the following Equation (30):

$$tLAMBDA=tLAMBDA0 \cdot hLambda \quad (30)$$

Since the correction ratio hLambda has a value greater than 1 when the air/fuel ratio is enriched, the target excess air factor tLAMBDA has a value greater than the basic target excess air factor tLambda0. The target fuel injection amount tQf is determined according to the routines whose flow charts are shown in FIGS. 23 and 24 described above by using the target excess air factor tLAMBDA which has been calculated in this manner.

Increasing the excess air factor results in a reduction of the target fuel injection amount tQf.

Furthermore, as shown in FIG. 30, the smaller the target engine output torque tTe, the larger the correction gain kLambda. Accordingly, if the fresh air intake amount error proportion dQac is supposed to be constant, then the smaller is the target engine output torque tTe, the greater does the correction ratio hLambda become. In the low load operational region for the diesel engine 30, which includes the steady operation state, torque shock can easily be experienced. Thus, in order efficiently to prevent torque shock, in this third embodiment, the lower is the load region, the greater is the correction gain. On the other hand, when during implementation of a rich spike the target fuel injection amount tQf is corrected by being reduced, there is a possibility that the time period taken until implementation of an excess air factor which is appropriate for a rich air/fuel ratio may be excessive. Since the operation conditions which are appropriate for a rich spike are not limited to ones which are maintained for a long time period, it is preferable to shorten the time period until the target excess air ratio is realized. Thus in this embodiment, by reducing the correction gain during high load conditions in which torque shock hardly occurs, the time period until implementation of the target excess air factor is shortened. Since the influence which is exerted upon the composition of the exhaust gas by the fresh air intake amount error during high load operational conditions is small, therefore, even if the correction gain at high load is small, the influence upon the composition of the exhaust gas is also small.

According to this embodiment, even if the target excess air factor tLAMBDA varies greatly, it is possible to realize the target excess air factor at an early stage while preventing the occurrence of torque shock.

Instead of calculating the fresh air intake amount error proportion dQac according to Equation (28), it is possible to set it to a value obtained by subtracting 1 from the ratio of the real intake air amount corresponding value ro2 and the target intake air amount corresponding value to2.

With regard to the method for determination of the excess air factor correction gain kLambda in the step S23 above, various variations are possible, such as the ones disclosed below in the descriptions of the fourth through the eighth embodiments of this invention.

Next a fourth embodiment of this invention will be explained with reference with reference to FIG. 31.

Figure 31:
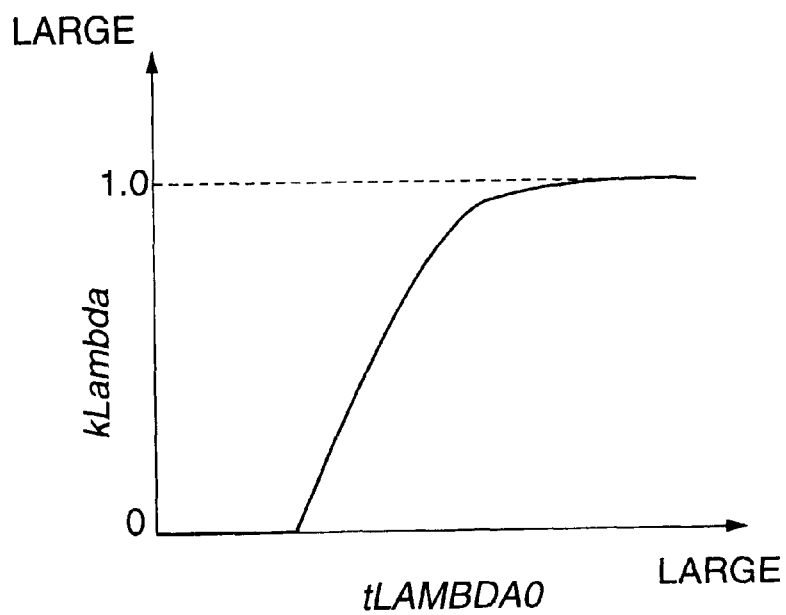
FIG. 31 is a diagram showing a characteristic of a map of the excess air factor correction gain kLambda, stored in a controller according to a fourth embodiment of this invention.

In this embodiment, when determining the excess air factor correction gain kLambda in the step S23 of the third embodiment, instead of the map of FIG. 30, a map whose characteristic is shown in FIG. 31 is used. With this map, the excess air factor correction gain kLambda is set according to the basic target excess air factor tLAMBDA0, and, the greater is the value of the basic target excess air factor tLAMBDA0, the greater does the value of the excess air factor correction gain kLambda become.

As will be clear from the routine of FIG. 8 and the map of FIG. 9, the greater is the value of the target engine output torque tTe, the less is the value of the basic target excess air factor tLAMBDA0. In other words, the greater is the value of the load upon the diesel engine 30, the less is the value of the basic target excess air factor tLAMBDA0. Accordingly, as well, the greater is the value of the load upon the diesel engine 30, the less is the value of the excess air factor correction gain kLambda which is obtained from the map shown in FIG. 31.

According to this embodiment also, when the target excess air factor tLAMBDA varies greatly, the target excess air factor is realized in a short time while preventing the occurrence of torque shock.

Next a fifth embodiment of this invention will be explained with reference to FIG. 32.

Figure 32:
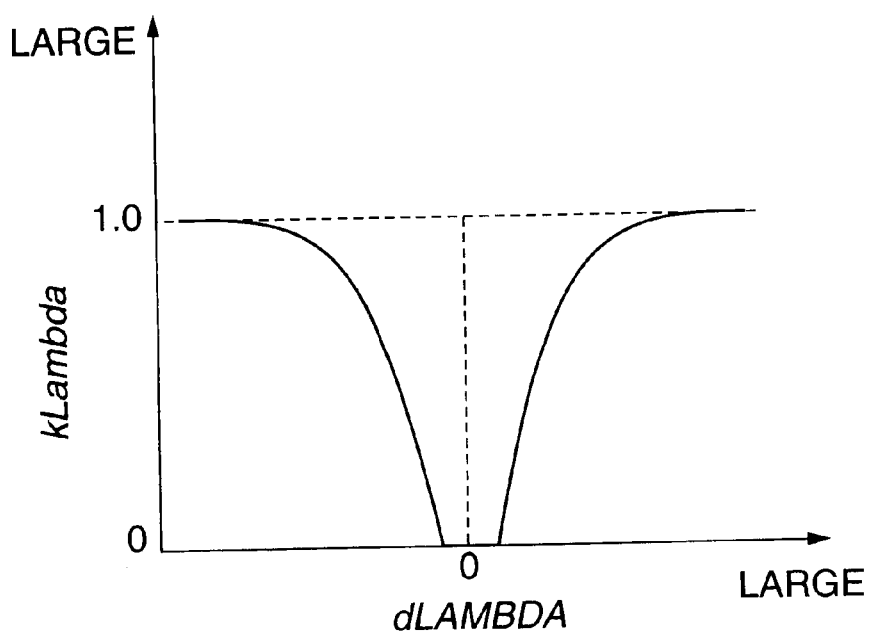
FIG. 32 is a diagram showing a characteristic of a map of the excess air factor correction gain kLambda, stored in a controller according to a fifth embodiment of this invention.

In this embodiment, when determining the excess air factor correction gain kLambda in the step S23 of the third embodiment, instead of the map of FIG. 30, a map whose characteristic is shown in FIG. 32 is used. With this map, the excess air factor correction gain kLambda is set according to the difference between the real excess air factor rLAMBDA and the basic target excess air factor tLAMBDA0 which has been calculated in the routine of FIG. 8. The real excess air factor rLAMBDA is calculated by the routines of FIGS. 11, 21, 22, and 28, just as in the second embodiment described above.

According to the map of FIG. 32, the greater is the value of the difference dLAMBDA of the excess air ratios, the greater is the value of the excess air factor correction gain kLambda as well. Before or after a rich spike, or in the initial stage of a sudden acceleration or a sudden deceleration, the target excess air factor varies greatly, and the difference between the basic target excess air factor tLAMBDA0 and the real excess air factor rLAMBDA also becomes great.

In such a condition, the excess air factor correction gain kLambda is set to a large value, and this gives priority to prevention of torque variation. On the other hand, during steady operation conditions, or during medium or gentle acceleration, or during the acceleration process after the initial stage of acceleration, the excess air factor correction gain kLambda is set to a small value, and this gives priority to promptly realizing the target excess air factor.

Next a sixth embodiment of this invention will be explained with reference to FIG. 33.

Figure 33:
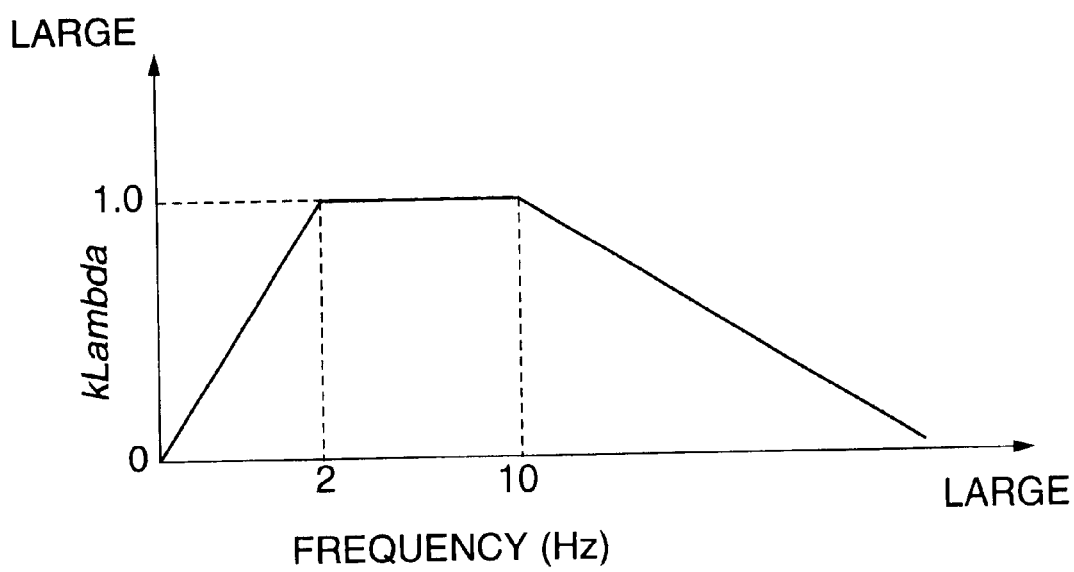
FIG. 33 is a diagram showing a characteristic of a band pass filter, stored in a controller according to a sixth embodiment of this invention.

In this embodiment, when determining the excess air factor correction gain kLambda in the step S23 of the third embodiment, instead of the map of FIG. 30, a band pass filter whose characteristic is shown in FIG. 33 is. This band pass filter is stored in the controller 20 in advance.

In the step S23, the fresh air intake amount error proportion dQac which was calculated in the step S22 is inputted to this band pass filter, and the output therefrom is taken as the excess air factor correction gain kLambda. This band pass filter is set so that the excess air factor correction gain kLambda becomes maximum in the frequency range from 2 to 10 hertz in which a human being is most sensitive to vibration. The calculation of the fresh air intake amount error proportion dQac is performed at intervals of ten milliseconds which corresponds to a frequency of 100 hertz. If the calculation results oscillates in the frequency range from 2 to 10 herz, torque shock is easily sensed by the vehicle driver or passengers. The band pass filter sets the excess air factor correction gain kLambda to the maximum value in this frequency range to suppress torque shock while preserving the performance to promptly realizing the target excess air factor by reducing the gain in other frequency range of the oscillation of the calculation results.

It would also be possible, instead of deriving the excess air factor correction gain kLambda directly from the band pass filter, first to refer to a map like the map of FIG. 30 which was based upon the engine rotation speed Ne and the target engine output torque tTe, in order to derive an excess air factor correction gain basic value kLambda0, just as was done in the third embodiment described above. On the other hand, the output obtained by inputting the fresh air intake amount error proportion dQac to the band pass filter would be taken as an excess air factor correction gain correction value KLambda1. And the product of the excess air factor correction gain basic value KLambda0 and the excess air factor correction gain correction value KLambda1 would be taken as the excess air factor correction gain kLambda.

By calculating the excess air factor correction gain kLambda by this type of process, it becomes possible to set the region in which priority is given to prevention of torque shock, and the region in which priority is given to promptly realizing the target excess air factor, according both to the engine load and also the frequency of vibration.

Next a seventh embodiment of this invention will be explained with reference to FIG. 34.

Figure 34:
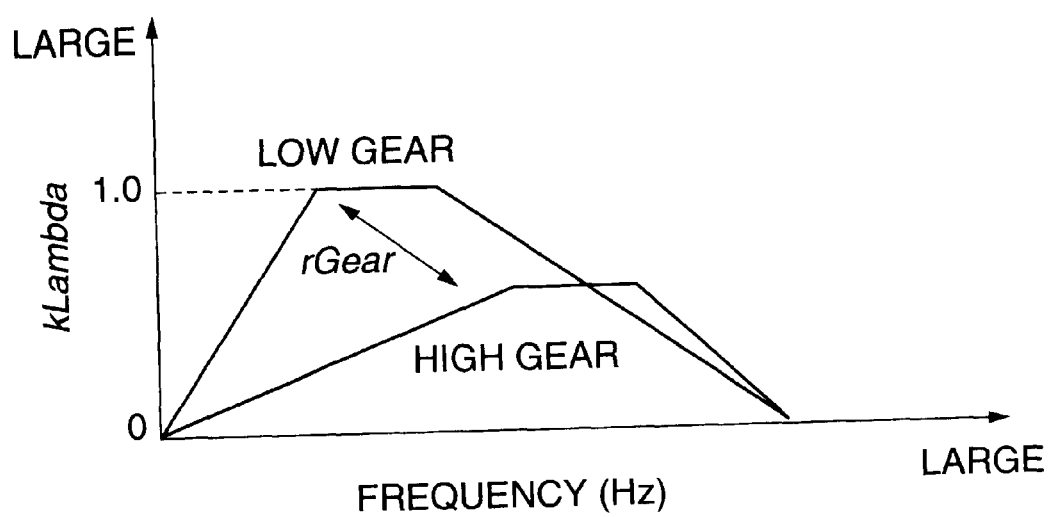
FIG. 34 is a diagram showing a characteristic of a band pass filter, stored in a controller according to a seventh embodiment of this invention.

In this embodiment, instead of the band pass filter of FIG. 33 of the sixth embodiment, a band pass filter shown in FIG. 34 is used. The band pass filter of FIG. 34 has different characteristics according to the gear position of an automatic transmission with which the vehicle is provided. This band pass filter is stored in the controller 20 in advance. Furthermore, the excess air factor control device according to this embodiment comprises a gear position sensor 40 such as shown in FIG. 1 which detects which gear position of the automatic transmission currently being utilized.

In the step S21 of the routine of FIG. 29, the controller 20 reads in a gear signal rGea from the gear position sensor 40 as well as the other parameters, and the excess air factor correction gain kLambda is calculated by inputting this gear signal rGear and the calculation results of the fresh air intake amount error proportion dQac into the band pass filter in the step S23. With the band pass filter of FIG. 34, the excess air factor correction gain kLambda is set for each gear according to the frequency of oscillation of the calculation result of the fresh air intake amount error proportion dQac. According to the shown characteristic of this filter, the peak value of the excess air factor correction gain kLambda with the first gear larger than that with the fourth gear.

Furthermore, with this filter, the frequency which gives the peak value of the excess air factor correction gain kLambda increases, the higher is the gear which is engaged.

Even if the variation of the engine output torque is at the same level, the subjective vibration which a human being experiences is different according to the gear position of the automatic transmission which is being utilized, and the frequency of the vibration which a human being experiences most easily also is different according to the gear position. By using the map of FIG. 34, prevention of torque variation may be counted upon in the operational region in which vibration is most keenly experienced, while in other operational regions priority is given to promptly realizing the target excess air factor.

Figure 35:
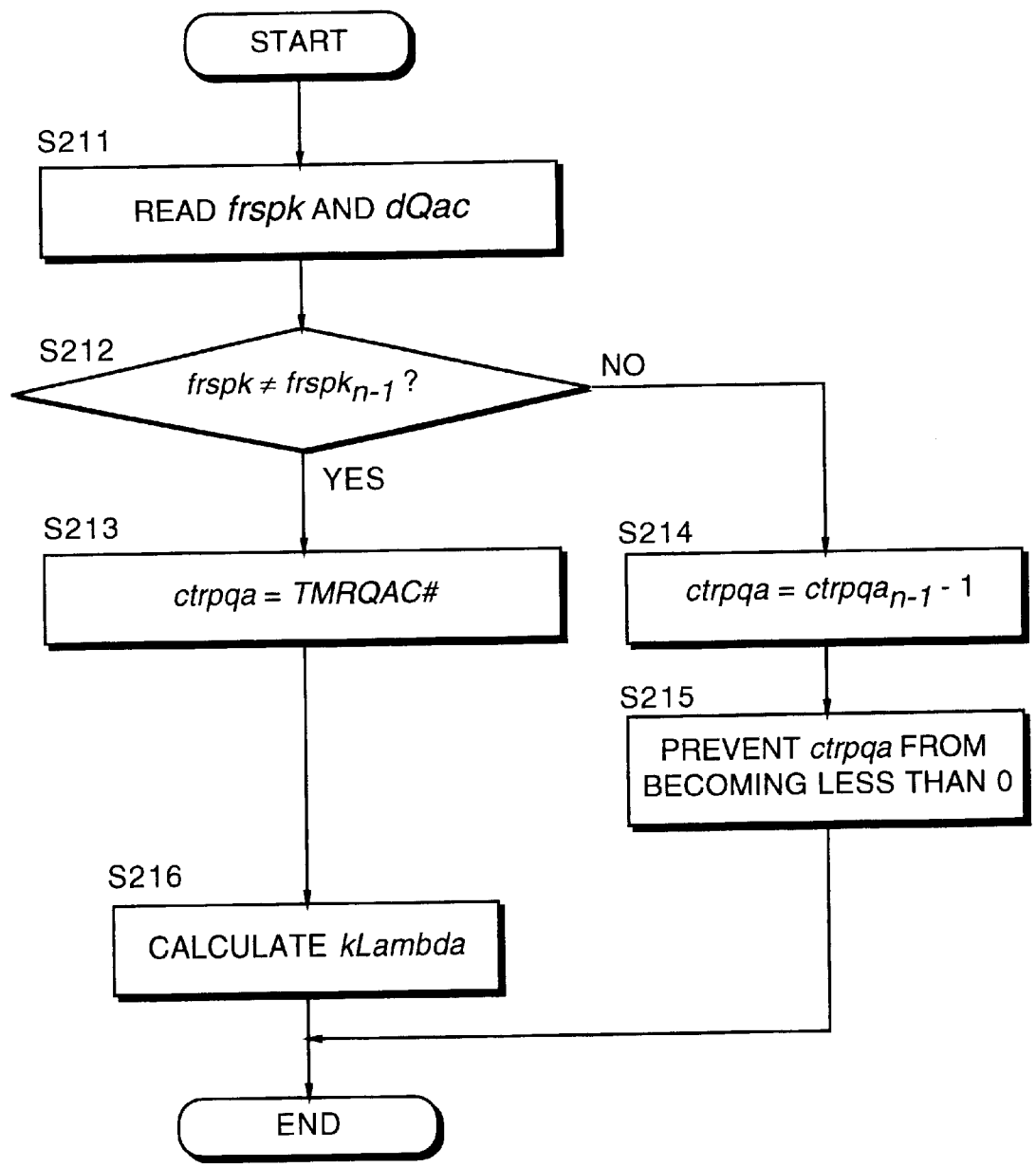
FIG. 35 is a flow chart for explanation of a routine for calculation of the excess air factor correction gain kLambda, executed by a controller according to an eighth embodiment of this invention.

Next an eighth embodiment of this invention will be explained with reference to FIGS. 35 and 36.

This embodiment relates to an alternative concept in relation to the method of calculation for the excess air factor correction gain kLambda which is executed in the step S23 of the third embodiment. According to this eighth embodiment, instead of making reference to the map of FIG. 30, the excess air factor correction gain kLambda is calculated by executing a subroutine for which a flow chart is shown in FIG. 35.

Referring to this figure, first in a step S211 the controller 20 reads in the rich spike flag frspk which was set by the routine of FIG. 7, and the value dQac which was calculated in the step S22 of the routine of FIG. 29.

Next, in a step S212, a decision is made as to whether or not the value of the rich spike flag frspk has varied from its value $frspk_{n-1}$ during the previous iteration. If the value of the rich spike flag frspk has indeed varied from its value $frspk_{n-1}$ during the previous iteration, then the subroutine proceeds to a step S213. On the other hand, if the value of the rich spike flag frspk is the same as its value $frspk_{n-1}$ during the previous iteration, then the subroutine proceeds to a step S214.

In the step S213, a correction counter value ctrpqa is set to a predetermined value TMRQAC#. This correction counter value ctrpqa is a value which specifies the time period that has elapsed from the start or the end of the rich spike.

After the process in the step S213, the controller 20 calculates the excess air factor correction gain kLambda in a step S216.

On the other hand, in the step S214, the correction counter value ctrpqa is reduced by unity. Next, in a step S215, it is determined if the correction counter value ctrpqa is a negative value, and if so, it is set to zero. After this procedure, the controller 20 calculates the excess air factor correction on gain kLambda in a step S216.

Figure 36:
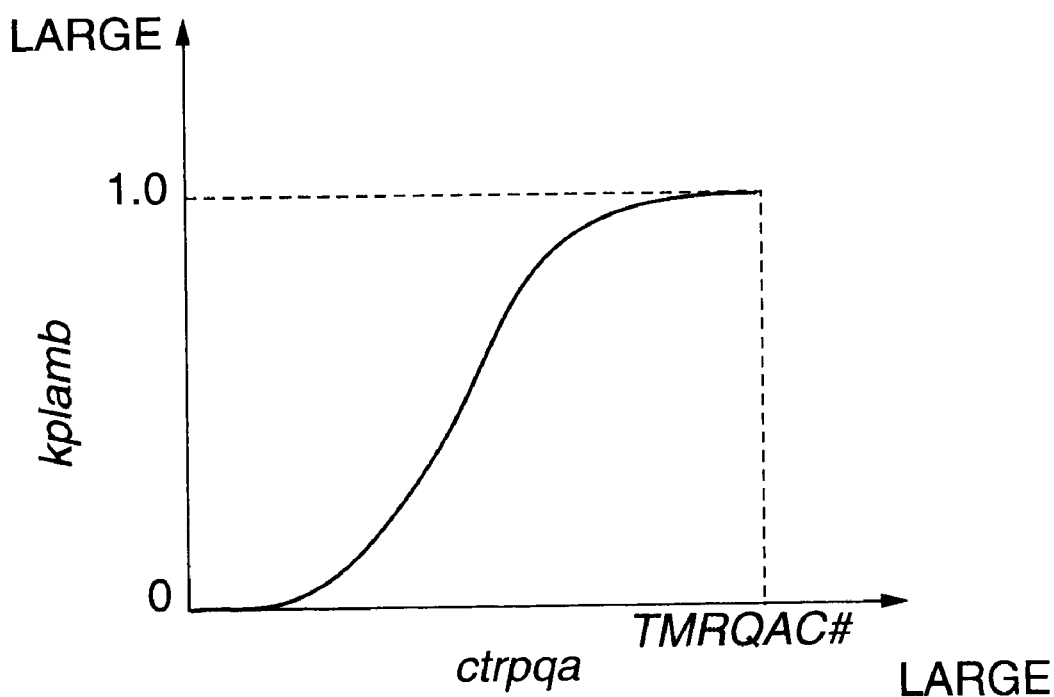
FIG. 36 is a diagram showing a characteristic of a map of a correction gain coefficient kplamb, stored in the controller according to the eighth embodiment of this invention.

In this step S216, the controller refers to a map of which the characteristic is shown in FIG. 36, and obtains a correction gain coefficient kplamb from the correction counter value ctrpqa.

Further, the excess air factor correction gain kLambda is calculated according to the following Equation (31), and the routine is terminated.

$$kLambda = dQac \cdot kplamb \tag{31}$$

In the map of FIG. 36, the correction gain coefficient kplamb is set so that, when the correction counter value ctrpqa is at its maximum, in other words directly after the start or the end of a rich spike, the excess air factor correction gain kLambda is at its maximum, while the excess air factor correction gain kLambda diminishes along with time elapsed since the start or the end of a rich spike.

According to this embodiment, variation of torque directly after the start or the end of a rich spike is prevented by a large excess air factor correction gain kLambda, while on the other hand, by diminishing this excess air factor correction gain kLambda along with the elapsed time after the start or end of rich spike, prompt realization of the target excess air factor is ensured.

Next a ninth embodiment of this invention will be explained with reference to FIG. 37.

In this embodiment, the target equivalence factor correction coefficient kFBYA is calculated based upon the oxygen concentration in the exhaust gas. In order to do this, the excess air factor control device comprises a universal oxygen sensor 21 such as shown in FIG. 1 in the exhaust passage 32 upstream of the exhaust turbine 1B. This universal oxygen sensor 21 detects the concentration of oxygen in the exhaust gas of the diesel engine 30, and outputs a signal to the controller 20.

Figure 37:
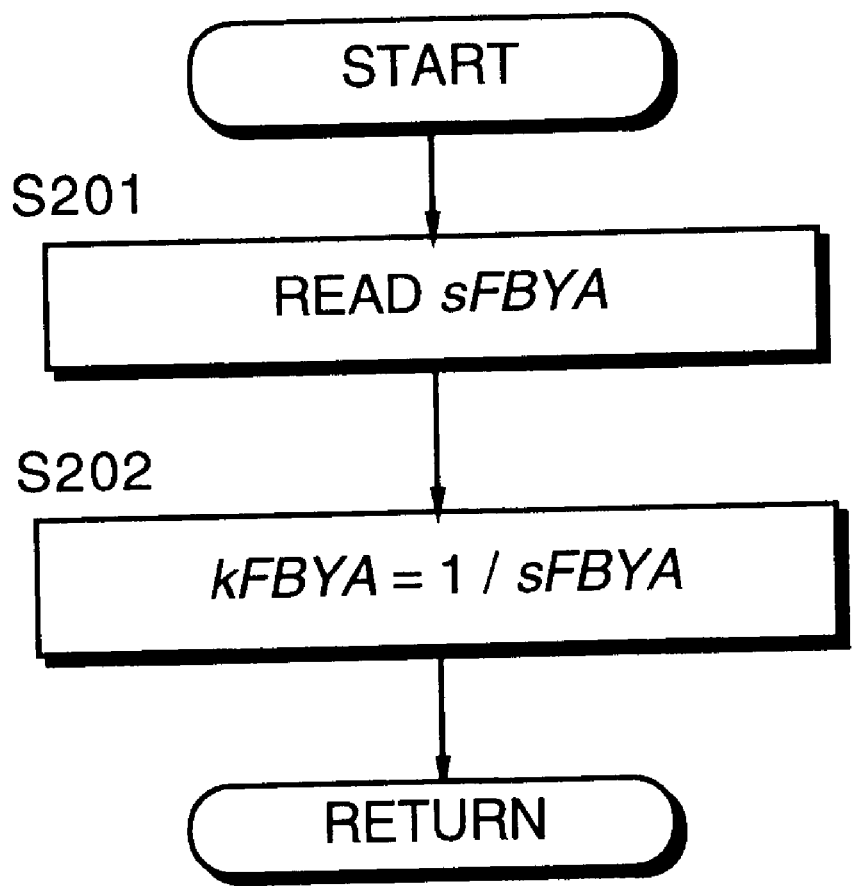
FIG. 37 is a flow chart for explanation of a subroutine for calculation of a target equivalence ratio correction coefficient kFBYA, executed by a controller according to a ninth embodiment of this invention.

The controller 20 calculates the target equivalence ratio correction coefficient kFBYA based upon the signal from the universal oxygen sensor 21 by executing a routine of which the flow chart is shown in FIG. 37. This routine is executed at periodic intervals of ten milliseconds while the diesel engine 30 is operating.

Referring to this figure, first in a step S201 the controller 20 obtains an real equivalence ratio sFBYA from the oxygen concentration in the exhaust gas by referring to a predetermined map. If the equivalence ratio of the mixture gas which is being combusted in the diesel engine 30 is less than 1, in other words if the excess air factor is greater than 1, then the oxygen concentration in the exhaust gas varies according to the excess air factor. Accordingly it is possible to obtain the real equivalence ratio sFBYA from the concentration of oxygen in the exhaust gas by referring to a map which specifies this relationship.

Next in a step S202 the controller 20 calculates the target equivalence ratio correction coefficient kFBYA according to the following Equation (32), and then this routine terminates.

$$kFBYA = 1/sFBYA \qquad (32)$$

The controller 20 corrects the target equivalence ratio tFBYA which has been calculated by the routine of FIG. 23 by multiplying this target equivalence ratio tFBYA by the target equivalence ratio correction coefficient kFBYA which has been calculated in this manner. And the target fuel injection amount tQf is calculated by the routine of FIG. 24 using this target equivalence ratio tFBYA after correction.

According to this embodiment, by controlling the fuel injection amount in a feedback manner based upon the real equivalence ratio, it is possible accurately to control the fuel injection amount, and it is possible to execute both prevention of torque variation and also control to promptly realizing the target value for the excess air factor with greater accuracy. The concept of this embodiment may also be combined with the concepts of any of the other embodiments disclosed.

Next a tenth embodiment of this invention will be explained with reference to FIGS. 38 through 40.

This embodiment relates to an alternative concept for the subroutine of FIG. 8 which is executed by the step S23 in the second embodiment. With this tenth embodiment, the real excess air factor rLAMBDA is obtained by a simpler calculation, using a plurality of lag gains and correction coefficients for them.

Figure 38:
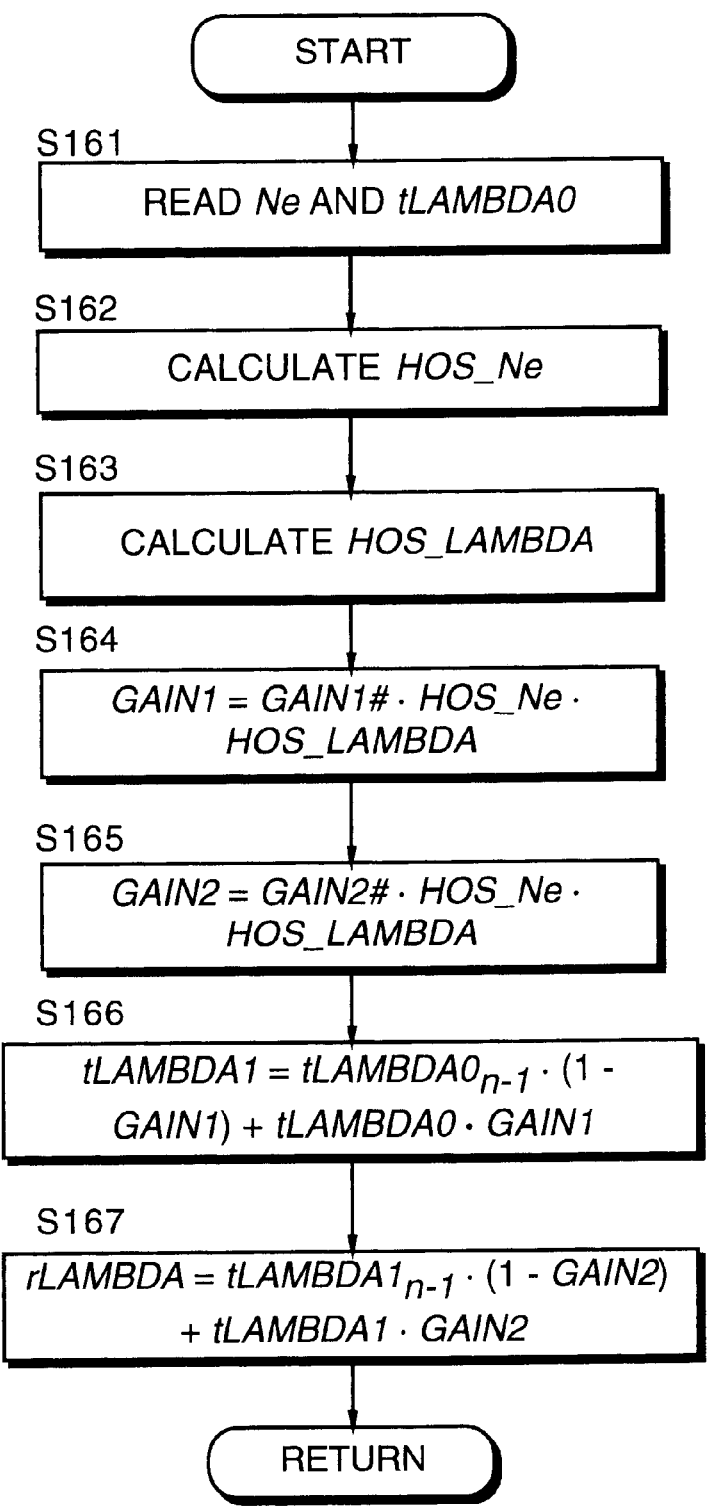
FIG. 38 is a flow chart for explanation of a subroutine for calculation of the real excess air factor rLAMBDA, executed by a controller according to a tenth embodiment of this invention.

Referring to FIG. 38 in which a flow chart for this alternative routine is shown, first in a step S161 the controller 20 reads in the engine rotation speed Ne and the basic target excess air factor tLAMBDA0 which has been calculated in the routine of FIG. 8.

Figure 39:
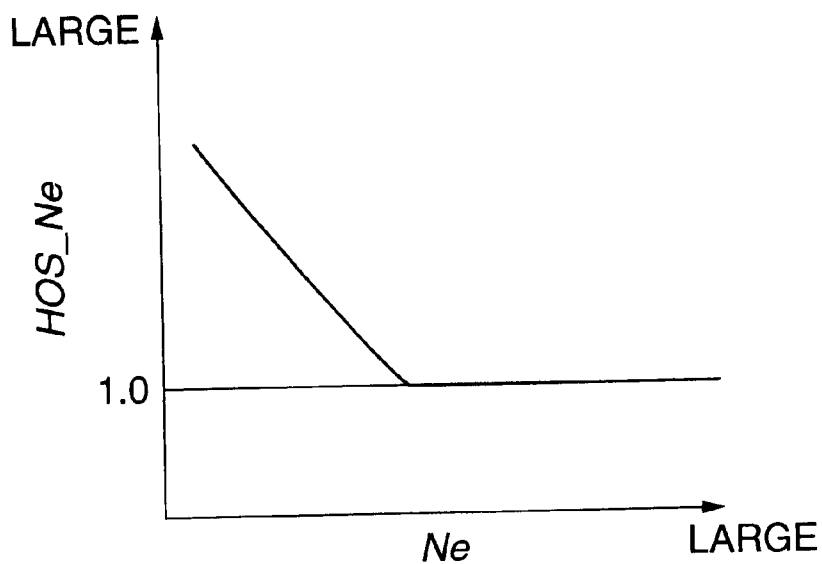
FIG. 39 is a diagram showing a characteristic of a map of a lag correction coefficient HOS_Ne, stored in the controller according to the tenth embodiment of this invention.

Next, in a step S162, a lag correction coefficient HOS_Ne is obtained based upon the engine rotation speed Ne by referring to a map of which the characteristic is shown in FIG. 39.

Figure 40:
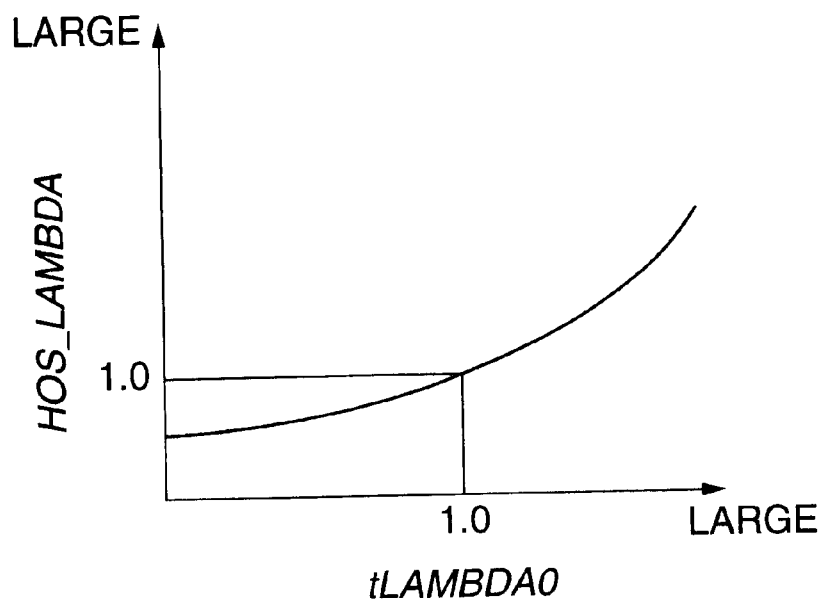
FIG. 40 is a diagram showing a characteristic of a map of a lag correction coefficient HOS_LAMBDA, stored in the controller according to the tenth embodiment of this invention.

Next, in a step S163, another lag correction coefficient HOS_LAMBDA is obtained based upon the basic target excess air factor tLAMBDA0 by referring to a map of which the characteristic is shown in FIG. 40.

Next in a step S164 a lag gain GAIN1 is calculated according to the following Equation (33):

$$GAIN1 = GAIN1\# \cdot HOS\_Ne \cdot HOS\_LAMBDA \qquad (33)$$

where,

GAIN1#=constant which is determined by the structure of the hardware.

Next, in a step S165, another lag gain GAIN2 is calculated according to the following Equation (34):

$$GAIN2 = GAIN2\# \cdot HOS\_Ne \cdot HOS\_LAMBDA \qquad (34)$$

where,

GAIN2#=constant which is determined by the structure of the hardware.

Here the lag gain GAIN1 represents a comparatively small response lag from the instant that the actuator 1C of the turbocharger 1 is actuated, to the time that the fresh air intake amount of the diesel engine 30 varies. The lag gain GAIN2 represents a comparatively large response lag from the instant that the actuator 1C of the turbocharger 1 is actuated, to the time that the amount of residual air in the EGR gas which are recirculated to the cylinder 30A of the diesel engine 30 varies. These response lags are different according to the structure of the air intake system and the EGR device, and also are influenced by the engine rotation speed Ne and the basic target excess air factor tLAMBDA0. In this connection, the lag gains GAIN1 and GAIN2 are determined by multiplying the constants GAIN1# and GAIN2# which depend upon the structure of the hardware, by the correction coefficients HOS_Ne and HOS_LAMBDA which depend upon the engine rotation speed Ne and the basic target excess air factor tLAMBDA0.

Next, in a step S166, a first order delay procedure is applied to the basic excess air factor tLAMBDA0 according to the following Equation (35), by using the comparatively small response lag gain GAIN1:

$$tLAMBDA1 = tLAMBDA0_{n-1} \cdot (1-GAIN1) + tLAMBDA0 \cdot GAIN1 \qquad (35)$$

Next, in a step S167, the real excess air factor rLAMBDA is calculated by further applying another first order delay procedure to the value tLAMBDA1 which has resulted from the first order delay procedure described above, according to the following Equation (36), by using the comparatively large response lag gain GAIN2:

$$rLAMBDA = tLAMBDA1_{n-1} \cdot (1-GAIN2) + tLAMBDA1 \cdot GAIN2 \qquad (36)$$

According to this embodiment of the present invention, it is possible to calculate the real excess air factor rLAMBDA in a more simple manner, than was done in the subroutine of FIG. 28 of the second embodiment.

Next an eleventh embodiment of this invention will be explained with reference to FIG. 41.

This embodiment relates to an alternative concept for the routine of FIG. 14 for calculating the target fresh air intake amount tQac, and is also capable of being applied to any of the other preferred embodiments described herein, by being combined with the routine of FIG. 37 according to the ninth preferred embodiment described above.

Figure 41:
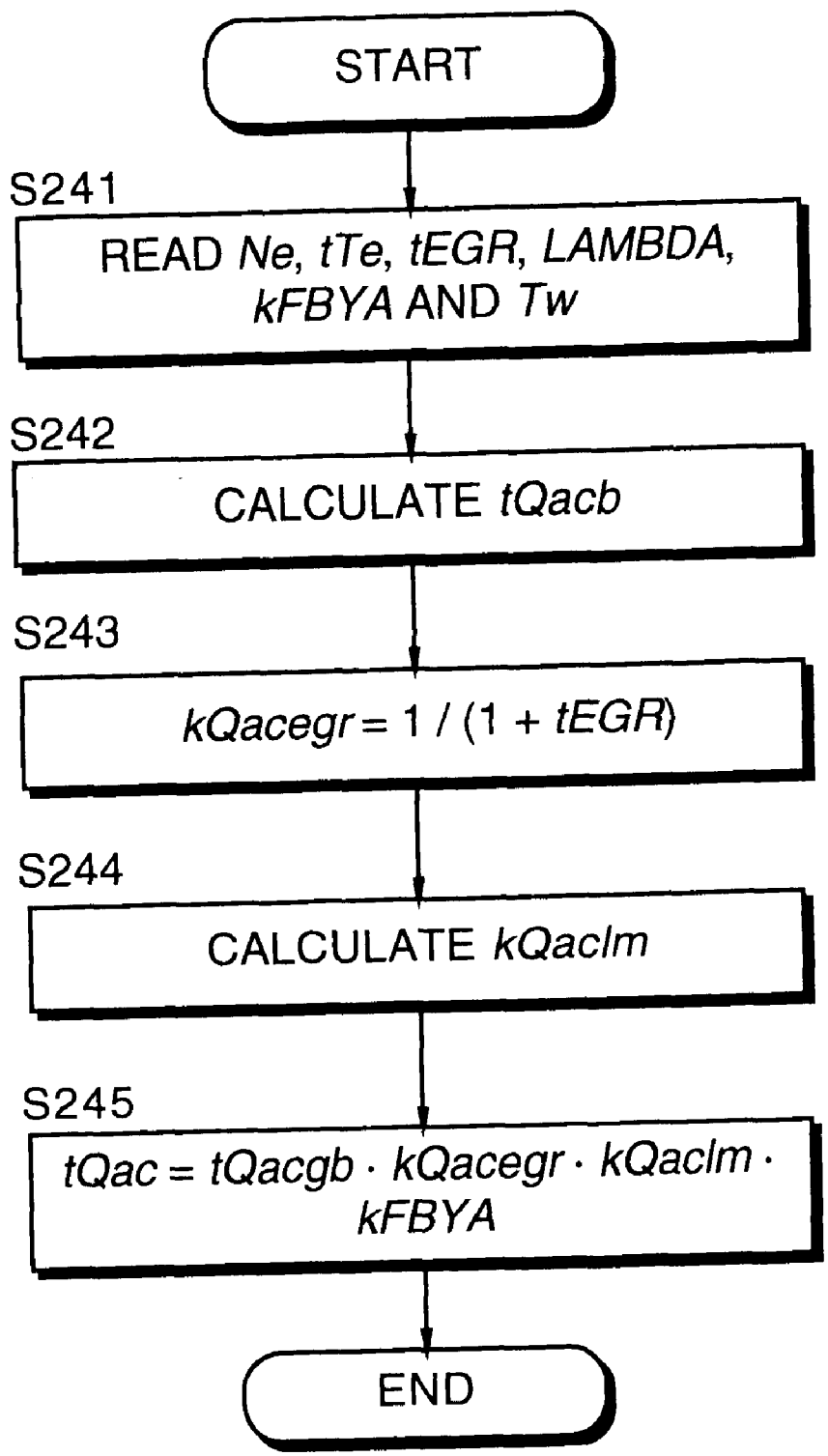
FIG. 41 is a flow chart for explanation of a routine for calculation of the target fresh air intake amount tQac, executed by a controller according to an eleventh embodiment of this invention.

Referring to FIG. 41, first in a step S241 the controller 20 reads in the engine rotation speed Ne, the target engine output torque tTe, the target EGR rate tEGR, the target excess air factor tLAMBDA, the target equivalence ratio correction coefficient kFBYA which has been calculated by the routine of FIG. 37, and the engine cooling water temperature Tw.

Next, in steps S242 through S244, the basic target intake air amount tQacb, the EGR correction coefficient kQacegr, and the excess air factor torque correction coefficient kQaclm are obtained in the same manner as in the steps S72 through S74 of the routine of FIG. 14.

In the next step S245 the target fresh air intake amount tQac is calculated according to the following Equation (37):

$$tQac = tQacb \cdot kQacegr \cdot kQaclm \cdot kFBYA \tag{37}$$

This equation differs from Equation (5) which was utilized in the step S75 of the routine of FIG. 14 in that, during the calculation of the target fresh air intake amount tQac using Equation (37), the target equivalence ratio correction coefficient kFBYA based upon the real equivalence ratio sFBYA is additionally multiplied in. Thus, according to this eleventh embodiment, in addition to the feedback control of the fuel injection amount based upon the real equivalence ratio sFBYA, also feedback control of the target fresh air intake amount tQac is implemented based upon the real equivalence ratio sFBYA.

Finally, a twelfth embodiment of this invention will be explained with reference to FIGS. 42 and 43.

This embodiment is related to an alternative concept for the routine of FIG. 11 for calculating the target EGR rate tEGR.

In this embodiment, the NOx concentration in the exhaust gas is used in the calculation of the target EGR rate tEGR. To this purpose, the excess air factor control device according to this embodiment comprises a NOx concentration sensor 31 such as shown in FIG. 1 in the exhaust passage 32 upstream of the exhaust turbine 1B. This NOx concentration sensor 31 detects the concentration of nitrogen oxides (NOx) present in the exhaust gas of the diesel engine 30 and outputs a signal representative thereof to the controller 20.

Figure 42:
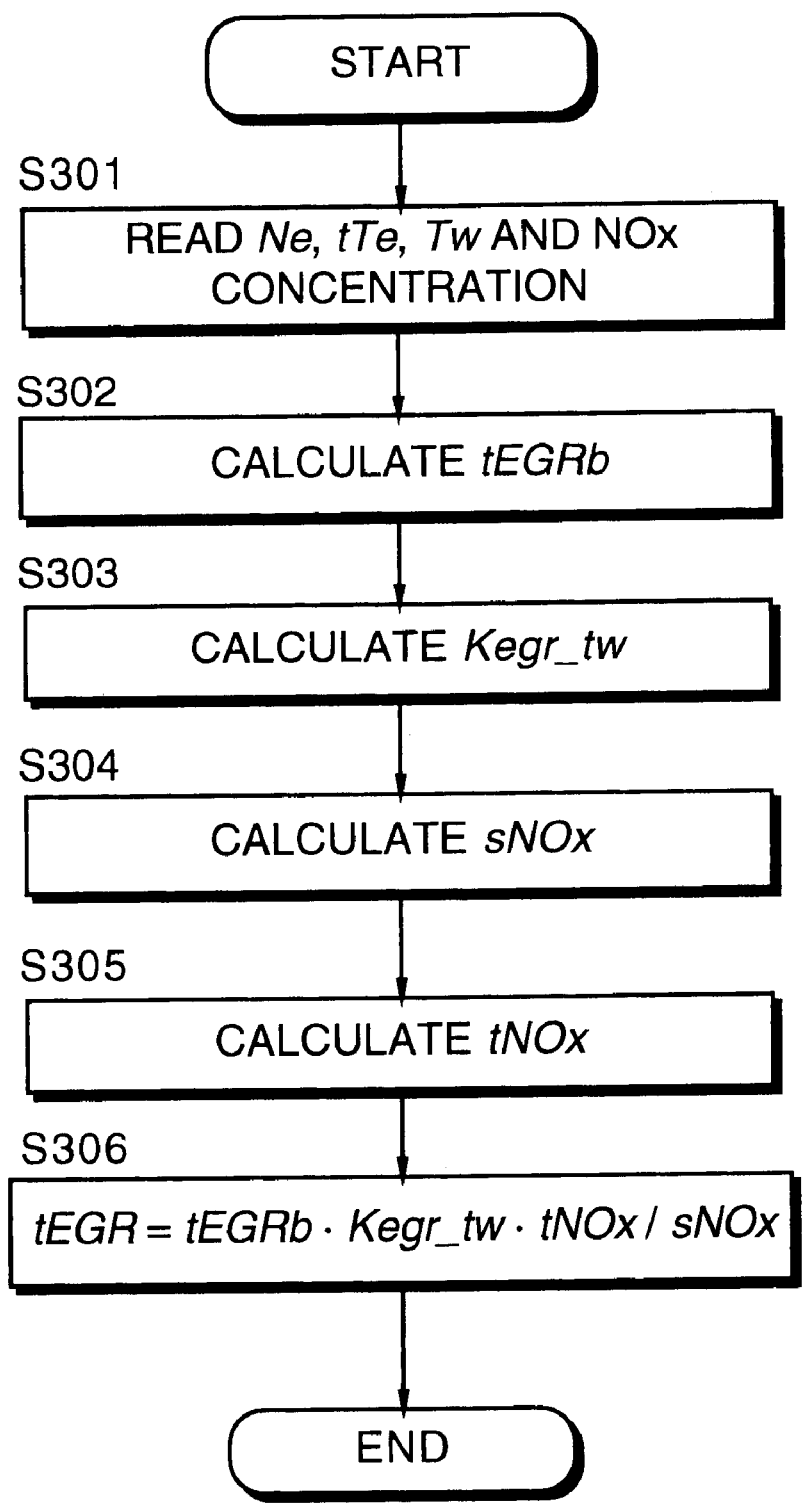
FIG. 42 is a flow chart for explanation of a routine for calculation of the target EGR rate tEGR, executed by a controller according to a twelfth embodiment of this invention.

The controller 20 executes a routine whose flow chart is shown in FIG. 42, and calculates the target EGR rate tEGR based upon this signal from the NOx concentration sensor 31. This routine is executed at periodic intervals often milliseconds while the diesel engine 30 is operating.

Referring to FIG. 42, first in a step S301 the controller 20 reads in the engine rotation speed Ne, the target engine output torque tTe, the engine cooling water temperature Tw, and the NOx concentration in the exhaust gas of the engine as detected by the NOx concentration sensor 31.

Next, in steps S302 and S303, a basic target EGR rate tEGRb and a water temperature correction coefficient Kegr_tw are calculated. These steps are the same as the steps S42 and S43 of the first embodiment shown in FIG. 11, respectively.

Next in a step S304 the controller 20 obtains an equivalence ratio sNOx by referring to a map thereof relative to NOx concentration in the exhaust gas which is stored internally to the controller 20 in advance. The concentration of NOx in the exhaust gas increases, the greater is the excess air factor. Accordingly, it is possible to determine the real equivalence ratio from the NOx concentration in the exhaust gas by referring to this map which specifies this relationship.

Figure 43:
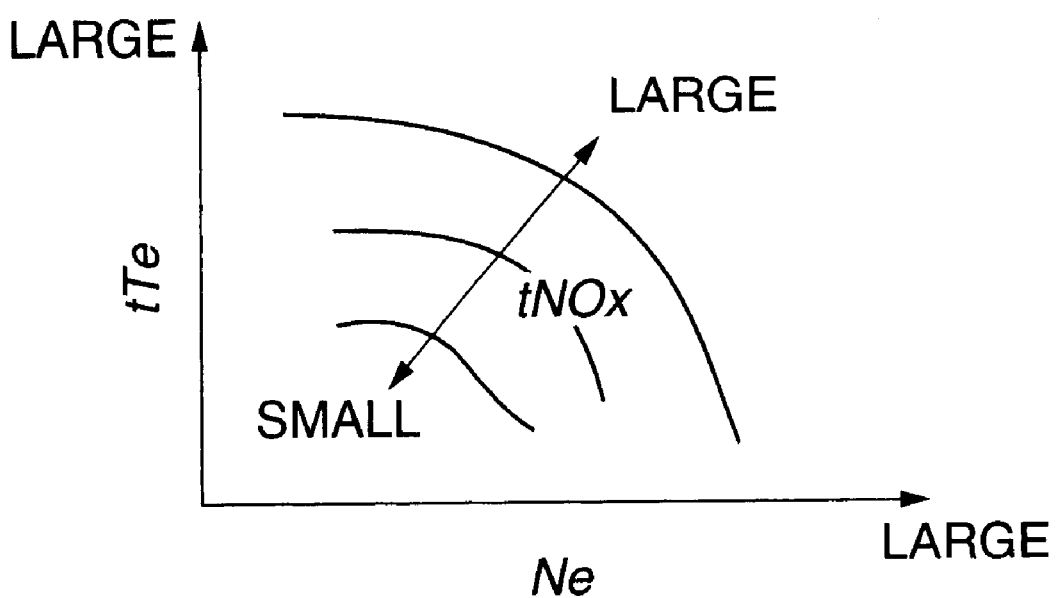
FIG. 43 is a diagram showing a characteristic of a map of an equivalence ratio tNOx corresponding to a target NOx concentration, which is stored in a controller according to a twelfth embodiment of this invention.

Next, in a step S305, an equivalence ratio tNOx which corresponds t to the target NOx concentration is calculated based upon the engine rotation speed Ne and the target engine output torque tTe, by referring to a map of which the characteristic is shown in FIG. 43.

Next, in a step S306, the target EGR rate tEGR is calculated according to the following Equation (38):

$$tEGR = tEGRb \cdot Kegr\_tw \cdot tNOx / sNOx \tag{38}$$

Equation (38) means that the target EGR rate tEGR which has been calculated according to Equation (3) of the first embodiment is corrected by the ratio of the target value for the NOx concentration in the exhaust gas and the real value thereof.

It is possible to improve the accuracy of control of the EGR rate by supplementing this correction.

FIGS. 45A through 45D and FIGS. 44A through 44D are figures showing, respectively, results obtained according to excess air factor control according to the this invention, and results for comparison obtained according to a prior art.

In the prior art, as shown for example in FIG. 44A, along with the target excess air factor tLAMBDA abruptly decreasing for a rich spike, the target fuel injection amount tQf increases, and the real fuel injection amount also increases, as shown in FIG. 44D. On the other hand, the real fresh air intake amount rQac gradually decreases as shown in FIG. 44B, irrespective of any abrupt decrease of the target fresh air intake amount tQac. As a result, since sufficient fresh air is still present for combustion of the increased fuel injection amount directly after the abrupt decrease of the target excess air factor tLAMBDA, thereby the output torque of the diesel engine 30 abruptly increases momentarily as shown FIG. 44C. This sudden increase of output torque causes torque shock.

In the same manner, with the excess air factor control according to this invention, the real fresh air intake amount rQac cannot track the sudden decrease of the target fresh air intake amount tQac directly after a rich spike, as shown in FIG. 45B. However, the controller 20 corrects the basic target excess air factor tLAMBDA0 according to the ratio, or the difference, between the target fresh air intake amount tQac and the real fresh air intake amount rQac. As a result, the target excess air factor tLAMBDA varies along a smooth curve, as shown in FIG. 45A. The fuel injection amount is controlled based upon this target excess air factor tLAMBDA.

Here, the target excess air factor tLAMBDA is greater than the basic target excess air factor tLAMBDA0. As a result the target fuel injection amount is corrected in the direction of being reduced, and, as shown in FIG. 45D, maintains the same level as before the start of the rich spike. Due to this, no torque shock is generated in accompaniment with the rich spike, as shown in FIG. 45C. On the other hand, after the real fresh air intake amount rQac has converged to the target fresh air intake amount tQac, the target excess air factor tLAMBDA becomes equal to the basic target excess air factor tLAMBDA0. Thereafter the fuel injection amount increases, since the target fuel injection amount is calculated using the value of the basic target excess air factor tLAMBDA0.

The contents of Tokugan2000-396011 with a filing date of Dec. 26, 2000 in Japan and Tokugan 2001-154385 with a filing date of May 23, 2001 in Japan, are hereby incorporated by reference.

Although the invention has been described above by reference to certain embodiments of the invention, the invention is not limited to the embodiments described above. Modifications and variations of the embodiments described above will occur to those skilled in the art, in light of the above teachings.

The embodiments of this invention in which an exclusive property or privilege is claimed are defined as follows.

What is claimed is:

1. A device for controlling an excess air factor of an air-fuel mixture which is supplied to an engine, comprising:
    a sensor which detects an operation condition of the engine;
    a sensor which detects a real fresh air intake amount of the engine;
    a fuel supply mechanism which supplies fuel to the engine; and a programmable controller programmed to:
  set a basic target excess air factor based upon the operation condition;
  set a target fresh air intake amount based upon the operation condition;
  calculate a target excess air factor by correcting the basic target excess air factor based upon the target fresh air intake amount and the real fresh air intake amount;
  calculate a target fuel supply amount based upon the target excess air factor; and
  control a fuel supply amount of the fuel supply mechanism to be equal to the target fuel supply amount.

2. The excess air factor control device as defined in claim 1, wherein the engine further comprises a nitrogen oxide trap catalyst which traps nitrogen oxides which are contained in an exhaust of the engine when the excess air factor is greater than one, and reduces the nitrogen oxides which have been trapped when the excess air factor is less than or equal to one; and the programmable controller is further programmed to change over the basic target excess air factor according to the operation condition from a value which is greater than one to a value which is less than one.

3. The excess air factor control device as defined in claim 1, wherein the programmable controller is further programmed to calculate the target excess air factor by correcting the basic target excess air factor based upon the ratio of the real intake air amount and the target fresh air intake amount.

4. The excess air factor control device as defined in claim 1, wherein the engine further comprises an exhaust gas recirculation device which recirculates a portion of an exhaust gas of the engine to an intake air of the engine, and the programmable controller is further programmed to:
  set a target exhaust recirculation ratio based upon the operation condition;
  calculate a target intake air amount corresponding value based upon the target fresh air intake amount, the basic target excess air factor, and the target exhaust recirculation ratio;
  calculate a real exhaust recirculation ratio based upon the real fresh air intake amount and the target exhaust recirculation ratio;
  calculate the real excess air factor by a predetermined calculation;
  calculate a real intake air amount corresponding value based upon the real fresh air intake amount, the real excess air factor, and the real exhaust recirculation ratio; and
  calculate the target excess air factor by correcting the basic target excess air factor based upon the real intake air amount corresponding value and the target intake air amount corresponding value.

5. The excess air factor control device as defined in claim 4, wherein the programmable controller is further programmed to:
  calculate the real exhaust gas recirculation amount based upon the real fresh air intake amount and the target exhaust recirculation ratio; and
  calculate the real excess air factor from the real fresh air intake amount and the real exhaust gas recirculation amount.

6. The excess air factor control device as defined in claim 4, wherein the programmable controller is further programmed to:
  calculate the real excess air factor by applying, to the basic target excess air factor, a first delay procedure based upon a first gain which represents a time period required for intake of fresh air to the engine, and a second delay procedure based upon a second gain which represents a time period required from the intake of the fresh air to the engine until a part of the fresh air is recirculated to the engine via the exhaust gas recirculation device.

7. The excess air factor control device as defined in claim 1, wherein the programmable controller is further programmed to:
  calculate an excess air factor correction gain by a predetermined calculation; and
  calculate the target excess air factor by correcting the basic target excess air factor based upon a ratio of the real fresh air intake amount and the target fresh air intake amount, and the excess air factor correction gain.

8. The excess air factor control device as defined in claim 7, wherein the operation condition detecting sensor comprise a sensor 18 which detects a rotation speed of the engine and a sensor which detects a depression amount of an accelerator pedal with which the engine is provided, and the programmable controller is further programmed to:
  calculate a target output torque of the engine based upon the engine rotation speed and the depression amount of the accelerator pedal; and
  calculate an excess air factor correction gain based upon the engine rotation speed and the target output torque.

9. The excess air factor control device as defined in claim 7, wherein the programmable controller is further programmed to:
  calculate a fresh air intake amount error proportion by subtracting one from the ratio of real fresh air intake amount and the target fresh air intake amount;
  calculate a correction ratio by adding one to a product of the fresh air intake amount error proportion and the excess air factor correction gain; and
  calculate the target excess air factor by multiplying the basic target excess air factor by the correction ratio.

10. The excess air factor control device as defined in claim 9, wherein the programmable controller is further programmed to obtain an excess air factor correction gain by processing the fresh air intake amount error proportion with a band pass filter which yields a large value in a specific frequency range.

11. The excess air factor control device as defined in claim 10, wherein the engine is linked to a vehicle automatic transmission, and the operation condition detecting sensor comprise a sensor which detects a gear position of the automatic transmission, and the band pass filter is configured to give a different excess air factor correction gain according to the gear position.

12. The excess air factor control device as defined in claim 7, wherein the programmable controller is further programmed to calculate the excess air factor correction gain based upon the basic target excess air factor.

13. The excess air factor control device as defined in claim 7, wherein the engine further comprises an exhaust gas recirculation device which recirculates a portion of an exhaust gas of the engine to an intake air of the engine, and the programmable controller is further programmed to:
  determine a target exhaust gas recirculation factor from the operation condition:
  calculate the real excess air factor from the real fresh air intake amount; and
  calculate the excess air factor correction gain based upon a difference of the real excess air factor and the basic target excess air factor.

14. The excess air factor control device as defined in claim 7, wherein the programmable controller is further programmed to:

change over the basic target excess air factor from a value greater than one to a value less than one, according to the operation condition; and reduce the excess air factor correction gain along with an elapsed time from a change-over of the basic target excess air factor from the value greater than one to the value less than one.

15. The excess air factor control device as defined in claim 1, wherein the operation condition detecting sensor comprise a sensor which detects an oxygen concentration in an exhaust gas of the engine; and the programmable controller is further programmed to:

calculate a target equivalence ratio based upon the target excess air factor;

calculate a target equivalence ratio correction coefficient based upon the oxygen concentration in the exhaust gas; and calculate a target fuel injection amount based upon a value obtained by correcting the target equivalence ratio by the target equivalence ratio correction coefficient.

16. The excess air factor control device as defined in claim 15, wherein the operation condition detecting sensor comprise a sensor 18 which detects a rotation speed of the engine and a sensor which detects a depression amount of an accelerator pedal with which the engine, and the programmable controller is further programmed to:

calculate a target output torque of the engine based upon the engine rotation speed and the a depression amount of the accelerator pedal;

set a basic target fresh air intake amount according to the engine rotation speed and the target output torque; and set the target fresh air intake amount by correcting the basic target fresh air intake amount by the target equivalence ratio correction coefficient.

17. The excess air factor control device as defined in claim 1, wherein the engine further comprises an exhaust recirculation device which recirculates a portion of an exhaust gas of the engine to an intake air of the engine, the operation condition detecting sensor comprise a nitrogen oxide concentration sensor which detects a real nitrogen oxides concentration in the exhaust gas of the engine, and the programmable controller is further programmed to:

determine a basic target exhaust recirculation ratio based upon the real nitrogen oxides concentration;

determine a target nitrogen oxides concentration in the exhaust gas based upon the real nitrogen oxides concentration, calculate a target exhaust gas recirculation ratio by correcting the basic target exhaust gas recirculation ratio based upon a ratio of the target nitrogen oxides concentration and the real nitrogen oxides concentration; and control the exhaust recirculation device to cause the exhaust gas recirculation ratio to be equal to target exhaust gas recirculation ratio.

18. A device for controlling an excess air factor of an air-fuel mixture which is supplied to an engine, comprising:

means for detecting an operation condition of the engine;

means for detecting a real fresh air intake amount of the engine;

means for supplying fuel to the engine;

means for setting a basic target excess air factor based upon the operation condition;

means for setting a target fresh air intake amount based upon the operation condition;

means for calculating a target excess air factor by correcting the basic target excess air factor based upon the target fresh air intake amount and the real fresh air intake amount;

means for calculating a target fuel supply amount based upon the target excess air factor; and means for controlling a fuel supply amount of the fuel supply means to be equal to the target fuel supply amount.

19. A method for controlling an excess air factor of an air-fuel mixture which is supplied to an engine by using a fuel supply mechanism which supplies fuel to the engine, comprising:

detecting an operation condition of the engine;

detecting a real fresh air intake amount of the engine;

setting a basic target excess air factor based upon the operation condition;

setting a target fresh air intake amount based upon the operation condition;

calculating a target excess air factor by correcting the basic target excess air factor based upon the target fresh air intake amount and the real fresh air intake amount;

calculating a target fuel supply amount based upon the target excess air factor; and controlling a fuel supply amount of the fuel supply mechanism to be equal to the target fuel supply amount.

\* \* \* \* \*